(12) United States Patent
Kawasaki et al.

(10) Patent No.: US 7,577,070 B2
(45) Date of Patent: Aug. 18, 2009

(54) OPTICAL RECORDING MEDIUM TILT COMPENSATION DEVICE, TILT COMPENSATION METHOD, AND OPTICAL INFORMATION RECORDING APPARATUS

(75) Inventors: Toshiyuki Kawasaki, Kanagawa (JP); Hideaki Hirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 596 days.

(21) Appl. No.: 11/373,992

(22) Filed: Mar. 14, 2006

(65) Prior Publication Data
US 2006/0215507 A1 Sep. 28, 2006

Related U.S. Application Data

(63) Continuation of application No. PCT/JP2004/011929, filed on Aug. 19, 2004.

(30) Foreign Application Priority Data

Sep. 18, 2003 (JP) .............................. 2003-326428
Feb. 6, 2004 (JP) .............................. 2004-030108

(51) Int. Cl.
G11B 15/62 (2006.01)
G11B 5/58 (2006.01)
G11B 17/32 (2006.01)

(52) U.S. Cl. ................................. 369/53.19; 369/44.32

(58) Field of Classification Search ........................ None
See application file for complete search history.

(56) References Cited

U.S. PATENT DOCUMENTS 5,303,216 A * 4/1994 Shinoda et al. .......... 369/44.13

| | | | |
|---|---|---|---|
| 5,430,699 A | 7/1995 | Matsubara et al. | |
| 5,881,034 A | 3/1999 | Mano et al. | |
| 6,023,379 A * | 2/2000 | Grassens et al. | 359/819 |
| 6,430,130 B1 * | 8/2002 | Furukawa | 369/53.19 |
| 7,450,335 B2 * | 11/2008 | Hirano et al. | 360/77.03 |

FOREIGN PATENT DOCUMENTS

| EP | 1 209 669 A2 | 5/2002 |
|---|---|---|
| JP | 6-259796 | 9/1994 |
| JP | 11-144280 | 5/1999 |
| JP | 2002-260264 | 9/2002 |
| JP | 2003-16677 | 1/2003 |
| WO | WO 03/075266 A1 | 9/2003 |

* cited by examiner

*Primary Examiner*—Joseph H Feild
*Assistant Examiner*—Parul Gupta
(74) *Attorney, Agent, or Firm*—Dickstein Shapiro LLP

(57) ABSTRACT

An optical recording medium tilt compensation device having a tilt compensation unit is disclosed that is able to compensate for a tilt error in servo control when recording or reproducing data in an optical recording medium. The optical recording medium tilt compensation device includes an object lens that condenses light from a light source on a recording surface of an optical recording medium; an object lens tilt actuator that controls a tilt of the object lens; an object lens tilt sensor that detects a tilt of the object lens; an optical recording medium tilt sensor that detects a tilt of the optical recording medium; a control unit that controls the tilt of the object lens in accordance with a tilt value from the optical recording medium tilt sensor so that an aberration of the spot condensed on the recording surface is minimum by driving the object lens tilt actuator; a gain variable unit that changes the magnitude of an output signal from the object lens tilt sensor or the optical recording medium tilt sensor.

17 Claims, 18 Drawing Sheets

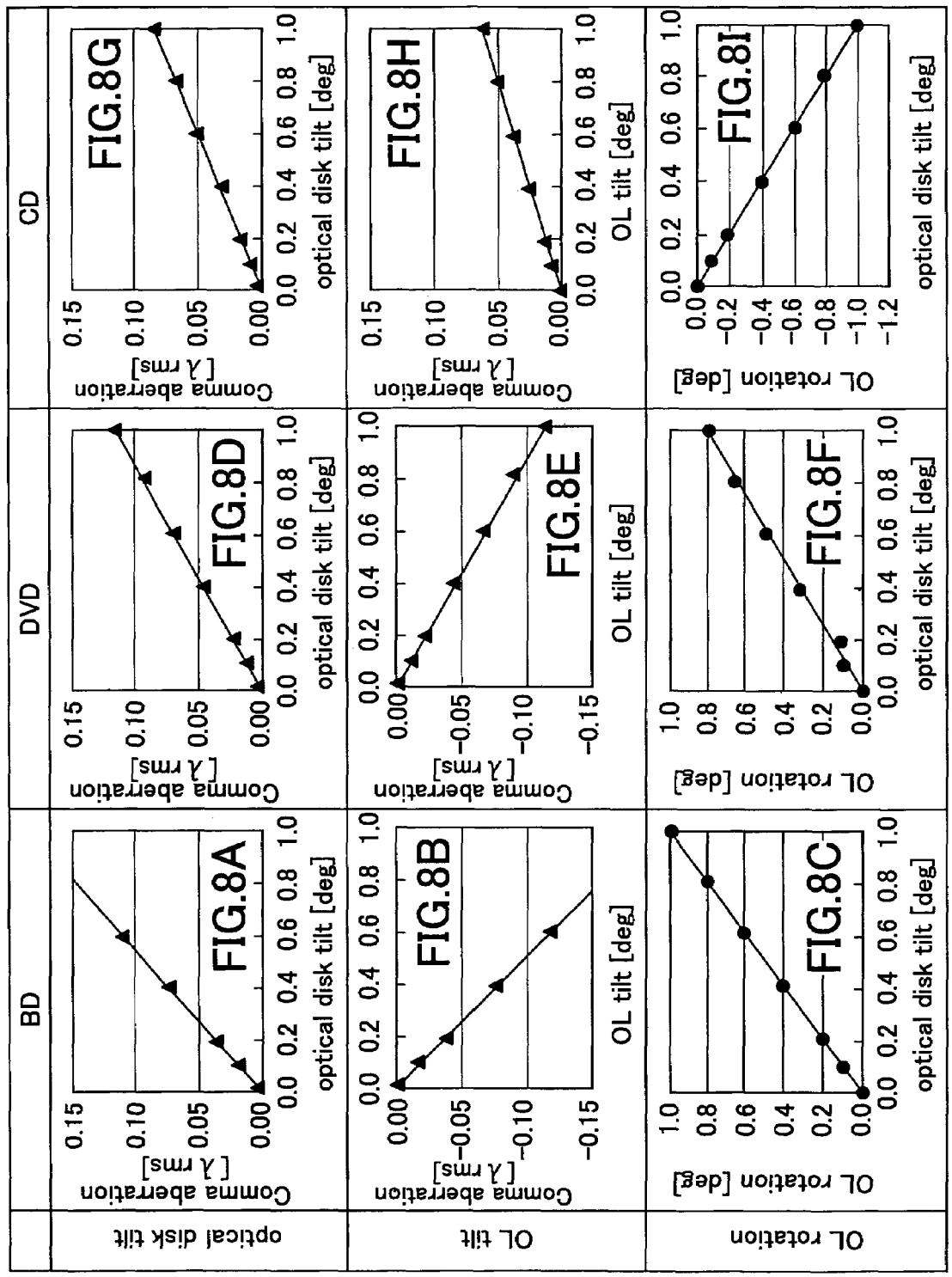

first phase correction element second phase correction element

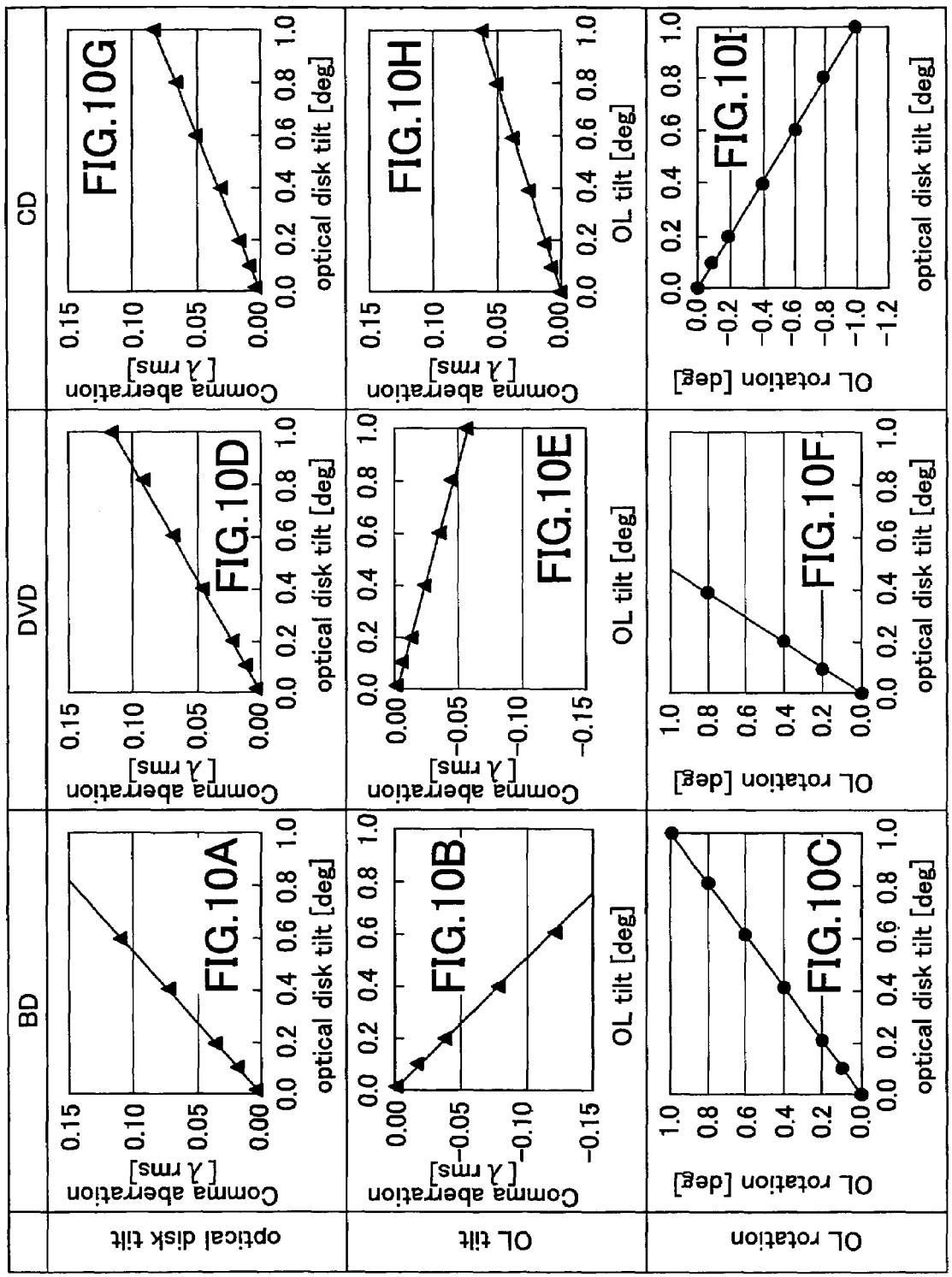

5 optical disk 2 object lens (OL)

5 optical disk 2 object lens (OL)

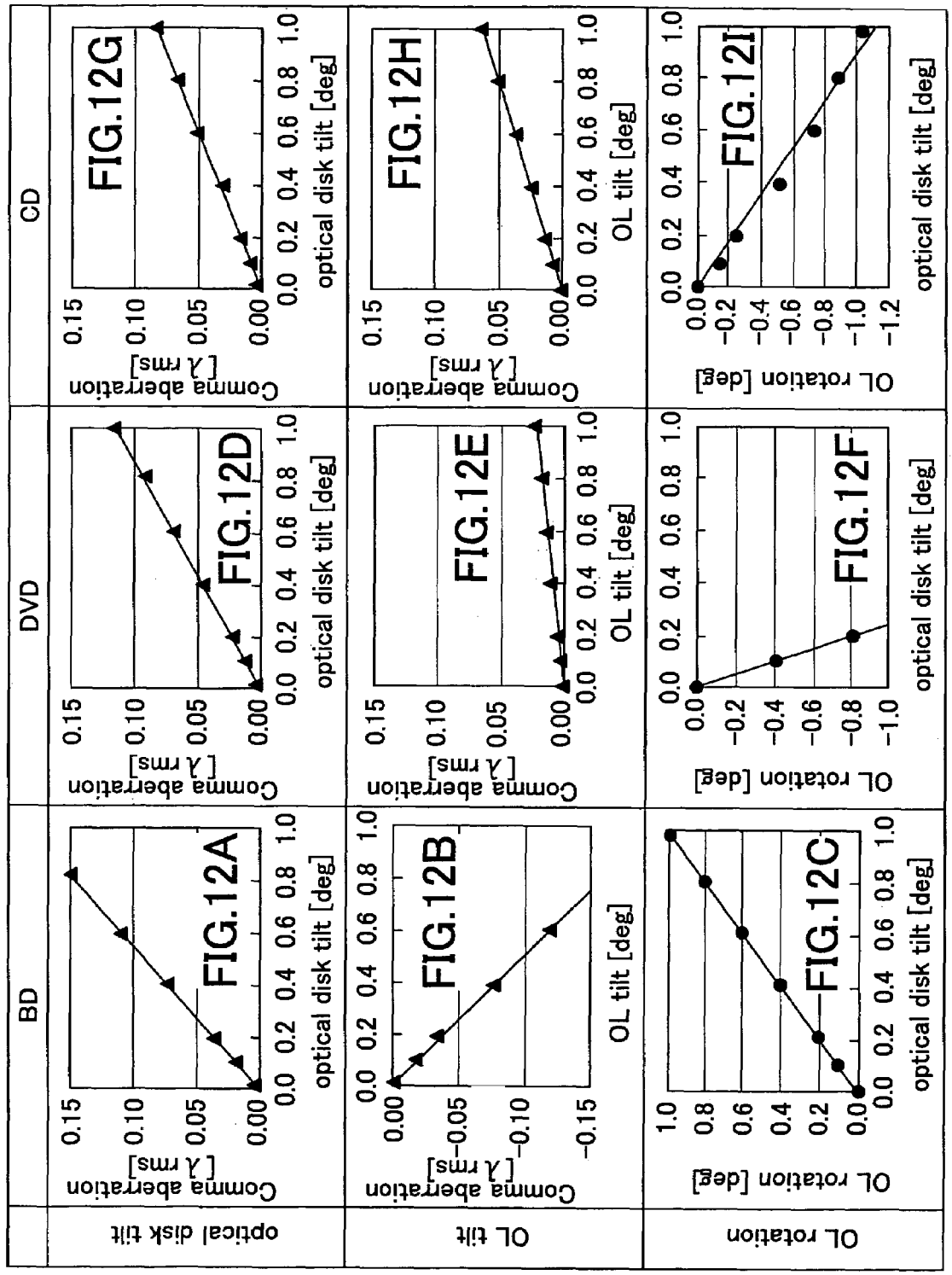

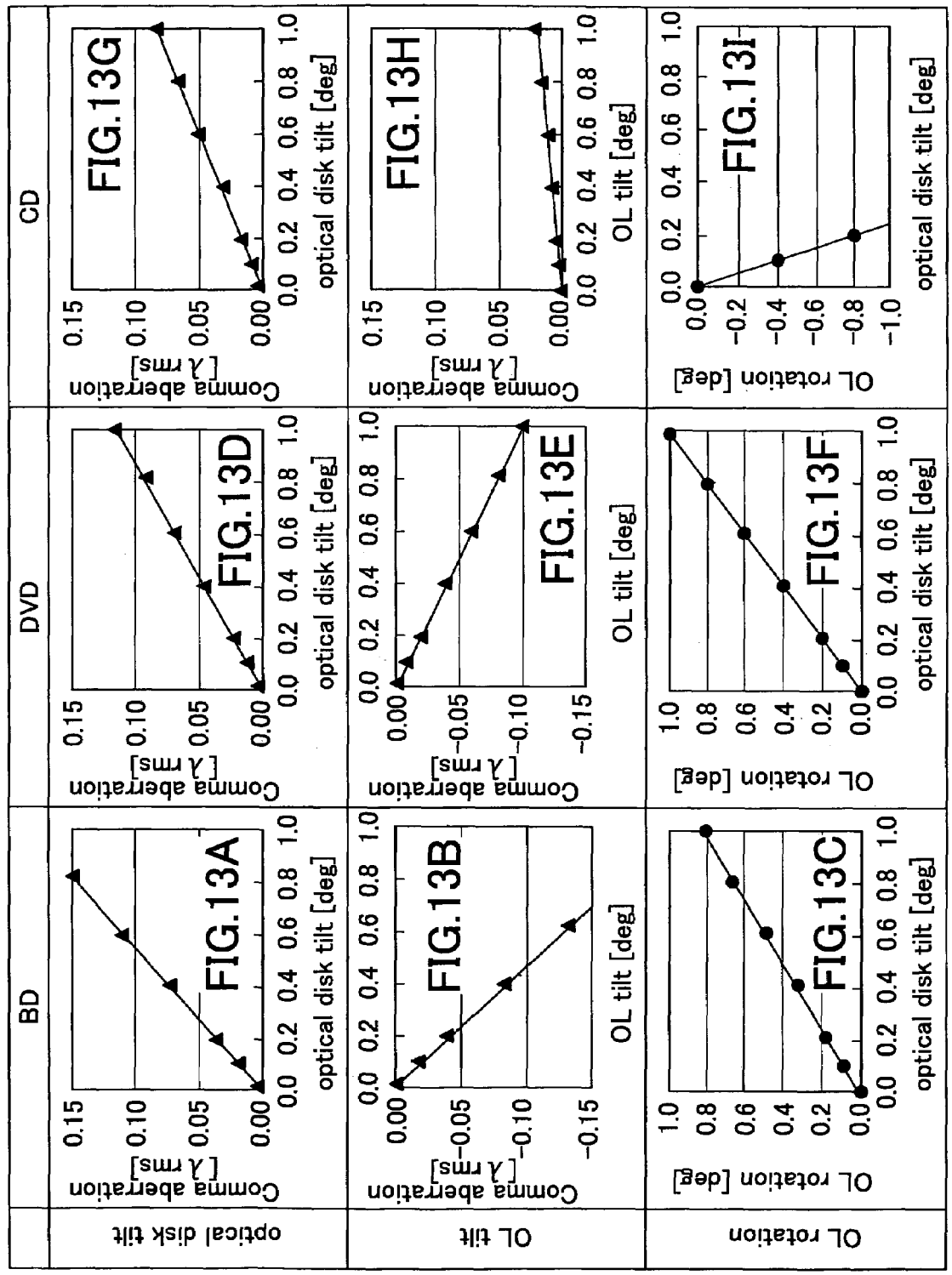

FIG.16
Spot size
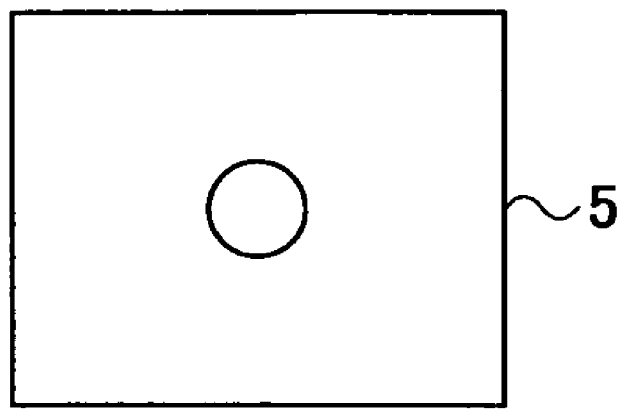
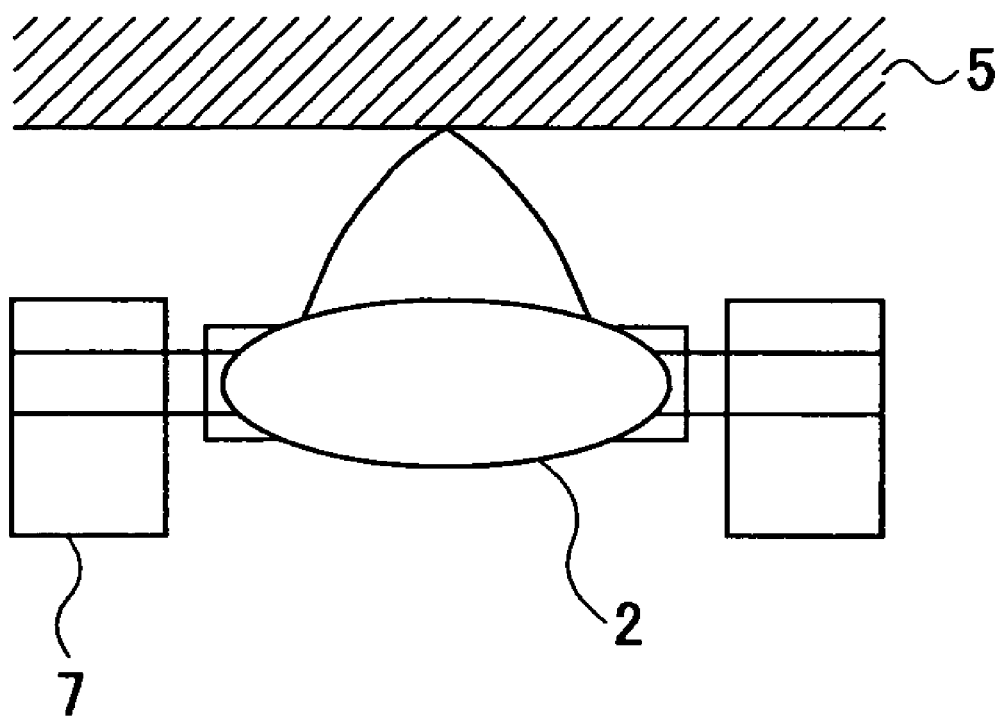
7
four-axial ACT
(actuator)
2

OPTICAL RECORDING MEDIUM TILT COMPENSATION DEVICE, TILT COMPENSATION METHOD, AND OPTICAL INFORMATION RECORDING APPARATUS

CROSS-REFERENCE TO RELATED APPLICATION

This application is a U.S. continuation application filed under 35 USC 111(a) claiming benefit under 35 USC 120 and 365(c) of PCT application JP2004/011929, filed on Sep. 18, 2004, which claims priority to Japanese patent applications No. 2003-326428 filed on Sep. 18, 2003, and No. 2004-030108 filed on Feb. 6, 2004. The foregoing applications are hereby incorporated herein by reference.

BACKGROUND OF THE INVENTION

1. Field of the Invention

The present invention particularly relates to an optical recording medium tilt compensation device having a tilt compensation unit able to compensate for a tilt error in servo control used when recording or reproducing data in an optical recording medium, a tilt compensation method, and an optical information recording apparatus using this method.

2. Description of the Related Art

A well known data recording method involves recording data on or reproducing data from an optical recording medium using light. A commercialized DVD system is a typical example of the optical recording method, which has been developed to meet the needs of recording image data compressed by MPEG2 equaling to two or more hours on one side of an optical recording medium 12 cm in diameter. In the DVD standard, the storage capacity of one side of the disk is 4.7 GB, the track density is 0.74 μm/track, and the line density is 0.267 μm/bit. Below, a DVD disk in compliance to this standard is referred to as "current DVD".

An optical head is used to reproduce data recorded on the optical recording medium, such as a DVD. In an optical head, by an objective lens, a laser beam from a laser diode is condensed on a series of pits in tracks on the optical recording medium. The light beam reflected from the optical recording medium is condensed on an optical detector by a condensing lens, thereby producing a reproduction signal. The reproduction signal from the optical detector is input to a reproduction signal processing system to perform demodulation. For recording media conforming to the DVD standard, the wavelength of the laser diode in the optical head is 650 nm, and the numerical aperture of the objective lens (NA) is 0.6.

In addition, a Blu-ray Disc standard is known as a high density DVD standard, which is expected to be a large capacity optical recording medium video recorder standard of the next generation. Specifically, at most 27 GB of video data can be recorded and reproduced repeatedly on one side of a phase change optical recording medium, which has the same 12 cm diameter as the CD and the DVD. With a Blu-ray Disc, although a blue laser of a short wavelength is used, by setting the numerical aperture of the objective lens (NA) for condensing the laser to be 0.85, the beam spot can be made tiny.

If using an optical recording medium including a light transmission protecting layer having a thickness of 0.1 mm, which meets the requirement of increased numerical apertures of lenses, the aberration caused by tilt of the optical recording medium can be reduced, and it is possible to reduce malfunctions in read operations or improve the recording density. For this reason, by reducing the recording track pitch of an optical recording medium to as small as 0.32 μm, which is only about half of the track pitch of a DVD, a high storage capacity of 27 GB on one side of an optical recording medium has been put in practical use.

FIG. 15 is a schematic view of an optical pickup capable of writing data in a DVD in the related art.

When an optical pickup is capable of writing data in a DVD, a polarization optical system is used to increase the illumination efficiency. Namely, in the path from a laser diode (LD) 1, which serves as a light source, to an object lens (OL) 2, a polarized beam splitter (PBS) 3 is arranged, allowing the linearly-polarized light having the same polarization plane as the polarization plane of the linearly-polarized light from the LASER DIODE 1 to pass through. A ¼ wave plate 4 is arranged in front of the polarized beam splitter 3 to convert the linearly-polarized light to circularly-polarized light. This circularly-polarized light is condensed on the object lens 2, and is irradiated on a recording layer under a substrate of an optical recording medium 5 (simply referred to as an "optical disk" below).

The light reflected from the reflection surface of the optical disk 5 is converted into circularly-polarized light in a rotating polarization direction opposite to the rotating polarization direction of the incident circularly-polarized light. Passing through the ¼ wave plate 4, the reflected circularly-polarized light is converted to linearly-polarized light having a polarization direction perpendicular to the polarization plane of the laser diode 1, and is reflected by the polarized beam splitter 3 so as to be directed to a photo detector (PD) 6.

If the ¼ wave plate 4 generates a perfect circularly-polarized laser beam, the light transmitting through polarized beam splitter 3, namely, the light returning to the laser diode 1 becomes "zero", and the reflected light from the optical disk 5 is totally detected by the photo detector 6.

Such an optical pickup scans fine recording marks on the optical disk 5 with a laser beam having a beam size reduced by the object lens 2 to reproduce the recorded data on the optical disk 5. In this process, on the back side of the optical disk 5, because of surface vertical runout, the data recording surface may be tilted relative to the laser beam from the optical pickup. In this case, the laser beam for reproducing data in the optical disk 5 ends up being incident on the data recording surface at an inclined angle (not orthogonal). Hence, the light spot produced on the data recording surface involves comma aberration, and as a result, the spot shape becomes asymmetric. Furthermore, it becomes difficult to precisely read the recorded data.

Considering the Blu-ray Disc, in order to obtain a very large capacity, the light spot should be greatly reduced, and for this purpose, the numerical aperture of the objective lens 2 should be reduced. In this case, because of the tilt of the optical disk 5, comma aberration increases, and the margin of the tilt of the optical disk 5 becomes small. For this reason, it is required to compensate for the tilt of the optical disk 5 to realize a very large capacity.

Japanese Laid-Open Patent Application No. 2002-260264 (hereinafter, refer to as reference 1) discloses a technique of tilt compensation by using a four-axial actuator (ACT).

FIG. 16 is a schematic view illustrating an arrangement of the object lens 2 and the four-axial actuator 7, and the size of the light spot on an optical disk under normal tilt driving condition in the related art.

As shown in FIG. 16, usually the object lens 2 is arranged parallel to the optical disk 5, and is supported by the wires of the four-axial actuator 7.

Under this condition, if an incident light beam is focused on the recording surface of the optical disk 5, and if viewing the shape of the light spot, one finds a round light spot as illustrated in a part of the optical disk 5 shown in the upper portion in FIG. 16.

FIG. 17 is a schematic view illustrating an arrangement of the object lens 2 and the four-axial actuator 7 and the size of the light spot on an optical disk 5 under abnormal tilt driving conditions in the related art.

However, if the optical disk 5 is tilted, as shown in FIG. 17, the light spot becomes an elliptical shape as illustrated in a part of the optical disk 5 shown in the upper portion in FIG. 17.

FIG. 18 is a schematic view illustrating an arrangement of the object lens 2 and the four-axial actuator 7 and the size of the light spot on an optical disk in the course of tilt compensation in the related art.

To solve the problems as shown in FIG. 17, as shown in FIG. 18, the object lens 2 is tilted by the four-axial actuator 7 to maintain the object lens 2 parallel to the optical disk 5.

Under this condition, a round light spot is obtained again as illustrated in a part of the optical disk 5 shown in the upper portion in FIG. 18.

Japanese Laid-Open Patent Application No. 2003-016677 (hereinafter, refer to as reference 2) discloses a technique of tilt compensation as described below. Specifically, at an initial position of the four-axial actuator relative to the object lens, if the optical axis of a laser beam is not perpendicular to the recording surface of the optical disk, or the tilt servo is executed when there is little reflected light during focus control, the tile error signal becomes unstable, the object lens is displaced, and the focus servo cannot be successful.

Upon this, as described in reference 2, the tilt control of the object lens is stabilized, specifically, the tilt control is performed ensuring the optical axis of a laser beam to be perpendicular to the recording surface of the optical disk, so that the tilt control of the optical disk is based on the tilt control of the object lens using the four-axial actuator to follow the warpage of the optical disk.

In addition, Japanese Laid-Open Patent Application No. 11-144280 (hereinafter, refer to as reference 3) discloses an optical disk device in which a tilt sensor is arranged on an object lens holder of an actuator to detect the relative tilt between the object lens and the optical disk. An object lens tilt driving quantity is calculated from the relative tilt between the object lens and the optical disk, and the actuator is driven by the quantity of the object lens tilt driving, thereby compensating for the optical disk tilt. Particularly, the optical disk device includes a servo signal calculation unit for calculating a servo signal such that the inclined angle between the object lens and the optical disk is an integer n (n is not 1).

However, in the tilt compensation system by using the above mentioned four-axial actuator, the tilt of the optical disk is detected, and the inclination of the object lens is to compensate for the tilt by a quantity exactly equaling to the detected tilt. In this method, the optical aberration depends on the shape of the object lens, and in most cases, the tilt angle of the lens resulting in minimum aberration is not equal to the tilt angle of the disk. Namely, even when the optical disk is maintained to be perpendicular to the optical axis of the object lens, sometimes, the aberration cannot be reduced.

In addition, when designing the shape of a lens, although it is possible to make the optical aberration minimum by equalizing the tilt angle of the lens with the tilt angle of the disk, in such a design, the wavelength has to be limited.

For example, when designing an object lens supporting three wavelengths of the Blu-ray Disc, DVD, and CD, for example, if it is designed that the optical comma aberration becomes the minimum when the optical disk is perpendicular to the optical axis of the object lens relative to the tilt angle of the optical disk at the wavelength of the Blu-ray Disc, the tilt angle of the lens resulting in minimum comma aberration is not equal to the tilt angle of the optical disk at the wavelengths of DVD and CD. Actually, it is difficult to make a design such that comma aberration is a minimum when the tilt angle of the lens is equal to the tilt angle of the optical disk at all wavelengths.

In addition, with an object lens working at a single wavelength, even when it is designed that the comma aberration is minimum when the tilt angle of the lens is equal to the tilt angle of the optical disk, due to change with time, temperature characteristics, and other factors, the tilt angle of the lens resulting from minimum comma aberration relative to the tilt angle of the optical disk changes gradually.

As disclosed in reference 3, when performing the object tilt control by using a servo signal calculation unit for calculating a servo signal such that the inclined angle of the object lens holder relative to the object disk is an integer n (n is not 1), the reference of the angle is the optical axis. However, the output value from the optical disk tilt sensor attached to the object lens holder gives a relative tilt between the object lens and the optical disk, but cannot give the optical disk tilt relative to the optical axis directly.

Thus, one has formula (1).

$$\theta e = (\theta 1 + \theta 2) \times n - \theta 2$$

Where $\theta e$ represents a tilt error, $\theta 1$ represents the inclined angle of the object disk relative to the object lens holder, $\theta 2$ represents the inclined angle of a lens actuator, n represents a constant defined by the wavelength of a laser beam, the beam size, the numerical aperture (NA), and the lens shape.

The formula (1) is quite complicated, and it is difficult to constitute the calculation circuit.

In formula (1), n is a parameter defined by a wavelength of a laser beam, a beam size, the numerical aperture (NA), and the lens shape. But this parameter n is not described specifically in reference 3. For example, preferable values of n are not described.

SUMMARY OF THE INVENTION

It is a general object of the present invention to solve one or more of the problems of the related art.

A more specific object of the present invention is to provide an optical recording medium tilt compensation device having a tilt compensation unit able to reduce comma aberration caused by optical tilt at plural wavelengths, a tilt compensation method, and an optical information recording apparatus.

According to a first aspect of the present invention, there is provided an optical recording medium tilt compensation device, comprising: an object lens that condenses light from a light source on a recording surface of an optical recording medium; an object lens tilt actuator that controls a tilt of the object lens; an object lens tilt sensor that detects a tilt of the object lens; an optical recording medium tilt sensor that detects a tilt of the optical recording medium; a control unit that controls the tilt of the object lens in accordance with a tilt value from the optical recording medium tilt sensor so that an aberration of the spot condensed on the recording surface is minimum by driving the object lens tilt actuator; a gain variable unit that changes a magnitude of an output signal from the object lens tilt sensor or the optical recording medium tilt sensor.

According to a second aspect of the present invention, there is provided an optical recording medium tilt compensation device, comprising: an object lens that condenses light from a light source on a recording surface of an optical recording medium; an object lens tilt actuator that controls a tilt of the object lens; an object lens tilt sensor that detects a tilt of the object lens; a first gain variable unit that amplifies amplitude of an output signal from the object lens tilt sensor; an optical recording medium tilt sensor that detects a tilt of the optical recording medium; a second gain variable unit that amplifies amplitude of an output signal from the optical recording medium tilt sensor; and a control unit that controls the tilt of the object lens in accordance with a tilt value from the optical recording medium tilt sensor so that an aberration of the spot condensed on the recording surface is minimum by driving the object lens tilt actuator, and a variable gain of the tilt of the object lens of the first gain variable unit including the object lens tilt sensor is different from a variable gain of the tilt of the optical recording medium of the second gain variable unit including the optical recording medium tilt sensor.

As an embodiment, in the optical recording medium tilt, the gain variable unit is arranged at a front stage of an input side of a calculating unit that calculates a relative tilt between the object lens and the optical recording medium from a tilt value from the object lens tilt sensor and a tilt value from the optical recording medium tilt sensor.

As an embodiment, the object lens condenses light from the light source having plural wavelengths on the recording surface of the optical recording medium; further, the object lens condenses light from the light source having three wavelengths on the recording surface of the optical recording medium.

As an embodiment, the gain variable unit changes the variable gain stepwise. In addition, one of the settings of the stepwise variable gain is zero. In addition, the stepwise variable gain includes three settings. In addition, the stepwise variable gain includes three settings, and one of the three settings is zero.

As an embodiment, the setting of the stepwise variable gain of one of the gain variable units respectively arranged at a later stage on an output side of the object lens tilt sensor and arranged at a later stage on an output side of the optical recording medium tilt sensor is less than or equal to 0.9 or greater than or equal to 1.1.

As an embodiment, a gain variable unit sets the variable gain to be a negative setting. In addition, the setting of the stepwise variable gain of the gain variable unit arranged at a later stage on an output side of the object lens tilt sensor has a sign opposite to the setting of the stepwise variable gain of the gain variable unit arranged at a later stage on an output side of the optical recording medium tilt sensor. In addition, the setting of the stepwise variable gain of the gain variable unit arranged at a later stage on an output side of the object lens tilt sensor and setting of the stepwise variable gain of the gain variable unit arranged at a later stage on an output side of the optical recording medium tilt sensor have opposite signs but the same absolute value by switching the polarity of one of the gain variable units. In addition, the gain variable unit arranged at a later stage on an output side of the object lens tilt sensor and the gain variable unit arranged at a later stage on an output side of the optical recording medium tilt sensor change a setting of the variable gain according to a determination result of a determination unit for determining a wavelength of the light source in use and the type of the optical recording medium.

As an embodiment, an output signal from the gain variable unit includes a portion changing constantly while the input signal is changing.

In addition, in the optical recording medium tilt compensation device, the output signal from the gain variable unit includes a portion having a constant output value with respect to a region of the input signal.

As an embodiment, wherein a ratio of the variable gain of each of the gain variable units respectively arranged at a later stage on an output side of the object lens tilt sensor and arranged at a later stage on an output side of the optical recording medium tilt sensor is 0.8 including the signs thereof.

In addition, in the optical recording medium tilt compensation device, a ratio of the variable gain of each of the gain variable units respectively arranged at a later stage on an output side of the object lens tilt sensor and arranged at a later stage on an output side of the optical recording medium tilt sensor is −1.0 including the signs thereof.

In addition, in the optical recording medium tilt compensation device, a ratio of the variable gain of each of the gain variable units respectively arranged at a later stage on an output side of the object lens tilt sensor and arranged at a later stage on an output side of the optical recording medium tilt sensor is switched between 0.8 and 1.0 including the signs thereof.

In addition, in the optical recording medium tilt compensation device, a ratio of the variable gain of each of the gain variable units respectively arranged at a later stage on an output side of the object lens tilt sensor and arranged at a later stage on an output side of the optical recording medium tilt sensor is switched between 1.0, 0.8, and −1.0 including the signs thereof.

In addition, in the optical recording medium tilt compensation device, a ratio of the variable gain of each of the gain variable units respectively arranged at a later stage on an output side of the object lens tilt sensor and arranged at a later stage on an output side of the optical recording medium tilt sensor is switched between 1.0, 2.0, and −1.0 including the signs thereof.

In addition, in the optical recording medium tilt compensation device, a ratio of the variable gain of each of the gain variable units respectively arranged at a later stage on an output side of the object lens tilt sensor and arranged at a later stage on an output side of the optical recording medium tilt sensor is switched between 1.0, −4.0, and −1.1 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 0.8, 1.0, and −4.0 including the signs thereof.

As an embodiment, the tilt of the object lens and the tilt of the optical recording medium tilt in a radial direction and a tangential direction of the optical recording medium are measured separately but at the same time for tilt compensation.

According to a third aspect of the present invention, there is provided a method of an optical recording medium tilt compensation device including an object lens tilt actuator that controls a tilt of an object lens for condensing light from a light source on a recording surface of an optical recording medium; an object lens tilt sensor that detects a tilt of the object lens; an optical recording medium tilt sensor that detects a tilt of the optical recording medium; and a control unit that controls the tilt of the object lens in accordance with a tilt value from the optical recording medium tilt sensor so that an aberration of the spot condensed on the recording surface is minimum by driving the object lens tilt actuator, wherein a magnitude of an output signal from the object lens tilt sensor or the optical recording medium tilt sensor is variable, said method comprising the steps of: multiplying the tilt output from the object lens tilt sensor by the variable gain, or multiplying the tilt output from the optical recording medium tilt sensor by the variable gain; and controlling the tilt of the object lens by using the object lens tilt actuator so that a relative tilt becomes zero, said relative tilt being calculated from a difference between the tilt of the object lens multiplied by the variable gain and the tilt of the optical recording medium or from a difference between the tilt of the object lens and the tilt of the optical recording medium multiplied by the variable gain.

As an embodiment, the object lens condenses light from the light source having plural wavelengths on the recording surface of the optical recording medium. In addition, the object lens condenses light from the light source having three wavelengths on the recording surface of the optical recording medium.

As an embodiment, the gain variable unit changes the variable gain stepwise. In addition, one of the settings of the stepwise variable gain is zero. In addition, the stepwise variable gain includes three settings. In addition, the stepwise variable gain includes three settings, and one of the three settings is zero.

As an embodiment, the setting of the stepwise variable gain of one of the gain variable units respectively arranged at a later stage on an output side of the object lens tilt sensor and arranged at a later stage on an output side of the optical recording medium tilt sensor is less than or equal to 0.9 or greater than or equal to 1.1.

As an embodiment, the gain variable unit sets the variable gain to be a negative setting. In addition, the setting of the stepwise variable gain of the gain variable unit arranged at a later stage on an output side of the object lens tilt sensor has a sign opposite to the setting of the stepwise variable gain of the gain variable unit arranged at a later stage on an output side of the optical recording medium tilt sensor.

In addition, the setting of the stepwise variable gain of the gain variable unit arranged at a later stage on an output side of the object lens tilt sensor and setting of the stepwise variable gain of the gain variable unit arranged at a later stage on an output side of the optical recording medium tilt sensor have opposite signs but the same absolute value by switching the polarity of one of the gain variable unit.

In addition, the gain variable unit arranged at a later stage on an output side of the object lens tilt sensor and the gain variable unit arranged at a later stage on an output side of the optical recording medium tilt sensor change a setting of the variable gain according to a determination result of a determination unit for determining a wavelength of the light source in use and the type of the optical recording medium.

As an embodiment, an output signal from the gain variable unit includes a portion changing constantly while the input signal is changing. In addition, the output signal from the gain variable unit includes a portion having a constant output value with respect to a region of the input signal.

As an embodiment, a ratio of the variable gain of each of the gain variable units respectively arranged at a later stage on an output side of the object lens tilt sensor and arranged at a later stage on an output side of the optical recording medium tilt sensor is 0.8 including the signs thereof.

In addition, a ratio of the variable gain of each of the gain variable units respectively arranged at a later stage on an output side of the object lens tilt sensor and arranged at a later stage on an output side of the optical recording medium tilt sensor is −1.0 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 0.8 and 1.0 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 1.0, 0.8, and −1.0 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 1.0, 2.0, and −1.0 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 1.0, −4.0, and −1.1 including the signs thereof.

In addition, a ratio of the variable gain of each of the gain variable units respectively arranged at a later stage on an output side of the object lens tilt sensor and arranged at a later stage on an output side of the optical recording medium tilt sensor is switched between 0.8, 1.0, and −4.0 including the signs thereof.

As an embodiment, the tilt of the object lens and the tilt of the optical recording medium tilt in a radial direction and a tangential direction of the optical recording medium are measured separately but at the same time for tilt compensation.

According to a fourth aspect of the present invention, there is provided an optical information processing apparatus, comprising an optical recording medium tilt compensation device including: an object lens that condenses light from a light source on a recording surface of an optical recording medium; an object lens tilt actuator that controls a tilt of the object lens; an object lens tilt sensor that detects the tilt of the object lens; an optical recording medium tilt sensor that detects a tilt of the optical recording medium; a control unit that controls the tilt of the object lens in accordance with a tilt value from the optical recording medium tilt sensor so that an aberration of the spot condensed on the recording surface is made minimum by driving the object lens tilt actuator; and a gain variable unit that changes a magnitude of an output signal from the object lens tilt sensor or the optical recording medium tilt sensor, wherein said optical information processing apparatus condenses light from a light source on a recording surface of an optical recording medium so as to record or delete data, and detects light transmitting through the optical recording medium or reflected from the optical recording medium by using the photo detector, or detects light condensed in a signal detection optical system by using the photo detector.

According to a fifth aspect of the present invention, there is provided an optical information processing apparatus that uses an optical recording medium tilt compensation method of compensating for tilt in an optical recording medium tilt compensation device including an object lens tilt actuator that controls a tilt of an object lens for condensing light from a light source on a recording surface of an optical recording medium; an object lens tilt sensor that detects the tilt of the object lens; an optical recording medium tilt sensor that detects a tilt of the optical recording medium; and a control unit that controls the tilt of the object lens in accordance with a tilt value from the optical recording medium tilt sensor so that an aberration of the spot condensed on the recording surface is made minimum by driving the object lens tilt actuator, wherein a magnitude of an output signal from the object lens tilt sensor or the optical recording medium tilt sensor is variable, said method comprising the steps of: multiplying the tilt output from the object lens tilt sensor by a variable gain, or multiplying the tilt output from the optical recording medium tilt sensor by the variable gain; and controlling the tilt of the object lens by using the object lens tilt actuator so that a relative tilt becomes zero, said relative tilt being calculated from a difference between the tilt of the object lens multiplied by the variable gain and the tilt of the optical recording medium or from a difference between the tilt of the object lens and the tilt of the optical recording medium multiplied by the variable gain, wherein said optical information processing apparatus condenses light from a light source on a recording surface of an optical recording medium so as to record or delete data, and detect light transmitting through the optical recording medium or reflected from the optical recording medium by using a photo detector, or detects light condensed in a signal detection optical system by using the photo detector.

According to the optical recording medium tilt compensation device, the tilt compensation method as described above, and the optical information processing apparatus, it is possible to perform high precision light condensing irradiation with little comma aberration of a beam spot. By using the optical recording medium tilt compensation device and the tilt compensation method, and by irradiation of condensed light having a highly precise beam spot, it is possible to reduce the margin of the optical disk tilt, and to realize information recording at high speed.

According to the present invention, instead of adjusting the object lens tilt so that the object lens tilt and the optical disk tilt are in agreement, object lens tilt is controlled so that the comma aberration of the beam spot on the recording surface is a minimum. This allows high precision light condensing irradiation with little comma aberration of the beam spot, and it is possible to provide an optical disk tilt compensation device capable of high speed recording and reproduction, the tilt compensation method, and an optical information processing apparatus using the optical disk tilt compensation device and the tilt compensation method.

These and other objects, features, and advantages of the present invention will become more apparent from the following detailed description of preferred embodiments given with reference to the accompanying drawings.

BRIEF DESCRIPTION OF THE DRAWINGS

FIG. 8A through FIG. 8C illustrate the tilt of the object lens 2 required to cancel the comma aberration caused by the tilt of the BD optical disk 5, the comma aberration caused by the tilt of the object lens 2 and the tilt of the optical disk 5.

FIG. 8D through FIG. 8F illustrate the tilt of the object lens 2 required to cancel the comma aberration caused by the tilt of the DVD optical disk 5, the comma aberration caused by the tilt of the object lens 2 and the tilt of the optical disk 5.

FIG. 8G through FIG. 8I illustrate the tilt of the object lens 2 required to cancel the comma aberration caused by the tilt of the CD optical disk 5, the comma aberration caused by the tilt of the object lens 2 and the tilt of the optical disk 5.

FIG. 10A through FIG. 10C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 10D through FIG. 10F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 10G through FIG. 10I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

FIG. 12A through FIG. 12C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 12D through FIG. 12F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 12G through FIG. 12I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

FIG. 13A through FIG. 13C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 13D through FIG. 13F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 13G through FIG. 13I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

FIG. 16 is a schematic view illustrating an arrangement of the object lens 2 and the four-axial actuator 7 and the size of the light spot on an optical disk under normal tilt driving condition in the related art;

DESCRIPTION OF THE PREFERRED EMBODIMENTS

Below, preferred embodiments of the present invention are explained with reference to the accompanying drawings.

In the following, the same numeral references are assigned to the same elements.

Figure 1:
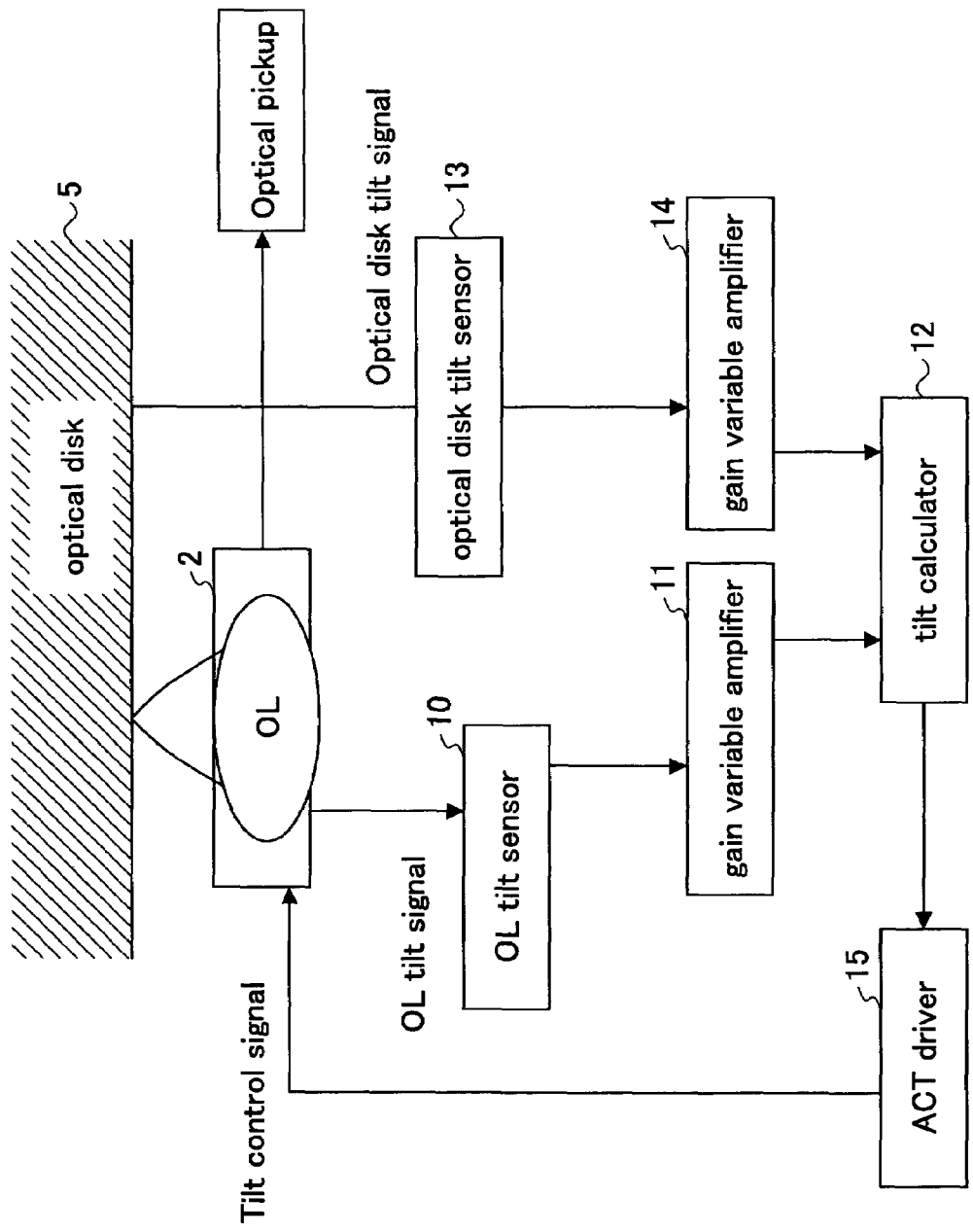
FIG. 1 is a block view schematically illustrating a configuration of an optical disk tilt compensation device according to a first embodiment of the present invention.

FIG. 1 is a block view schematically illustrating a configuration of an optical disk tilt compensation device according to a first embodiment of the present invention.

As show in FIG. 1, an object lens (OL) 2 is fixed on an actuator (ACT), and can be adjusted in a radial tilt direction and a tangential tilt direction by applying an external signal. An object lens tilt sensor 10 detects a tilt of the object lens 2 in the radial direction and the tangential direction, separately, and detected tilt is input to a tilt calculator 12 through a gain variable amplifier 11, which serves as the "gain variable unit" in the claims.

The tilt of the optical disk 5 is detected by an optical disk tilt sensor 13 in the radial direction and the tangential direction, separately, and is input to the tilt calculator 12 through a gain variable amplifier 14. The tilt calculator 12 calculates the desired tilt of the object lens 2 from the detected tilt of the object lens 2 and the detected tilt of the optical disk 5, that is, the tilt of the object lens 2 that results in a minimum comma aberration. This calculation result is input to the four-axial actuator to combine a tilt control signal.

For example, as shown in FIG. 1, the tilt calculator 12 multiplies the tilt of the object lens 2 by a variable gain, and calculates the difference between the tilt of the object lens 2 multiplied by the variable gain and the tilt of the optical disk 5. This difference is referred to as a "relative tilt". The tilt of the object lens 2 is controlled by using the four-axial actuator so that the relative tilt becomes zero, so that the comma aberration of the light spot on the recording surface is a minimum.

As a result, inside the control loop, it appears that control is performed to just reduce the error to be zero, but from the outside, it appears that the tilt of the object lens s is controlled to reduce the comma aberration of the light spot on the recording surface of the optical disk 5 to be minimum.

The gain variable amplifier 14 and the gain variable amplifier 11 can arbitrarily change their gains, namely, can arbitrarily change their output relative to the input, and are set to have specific variable gain in accordance with the light source wavelength and the optical disk types.

As show in FIG. 1, an optical disk tilt sensor used in the tilt compensation system is attached to a fixed part, such as the housing of the pickup housing. Hence, it is possible to measure the tilt of an individual optical disk 5, but not the relative tilt between the object lens 2 and the optical disk 5. Because the calculations made in the tilt calculator 12 merely involve calculations of the difference between the output of the object lens tilt sensor 10 and the output of the optical disk tilt sensor 13 passing through the gain variable amplifiers 11, 14, this makes the calculations very simple, the circuit very small, and reduces the cost.

In addition, gains of the gain variable amplifiers 11, 14 are adjusted so that the tilt of the object lens 2 from the object lens tilt sensor 10 is not the same as the tilt of the optical disk 5 from the optical disk tilt sensor 13.

The gain variable amplifiers 11, 14 are arranged at a front stage of the input side of the tilt calculator 12, and the gain variable amplifier 11 is arranged at least at a later stage on an output side of the object lens tilt sensor 10, or the gain variable amplifier 14 is arranged at least at a later stage on an output side of the optical disk tilt sensor 13, or the gain variable amplifier 11 is arranged at least at a later stage on the output side of the object lens tilt sensor 10 and while the gain variable amplifier 14 is arranged at least at a later stage on an output side of the optical disk tilt sensor 13.

As described above, the gain variable amplifier 14 and the gain variable amplifier 11 can arbitrarily change their gains, hence, the object lens 2 can be arranged at any angle relative to the tilt of the optical disk 5.

Figure 2:
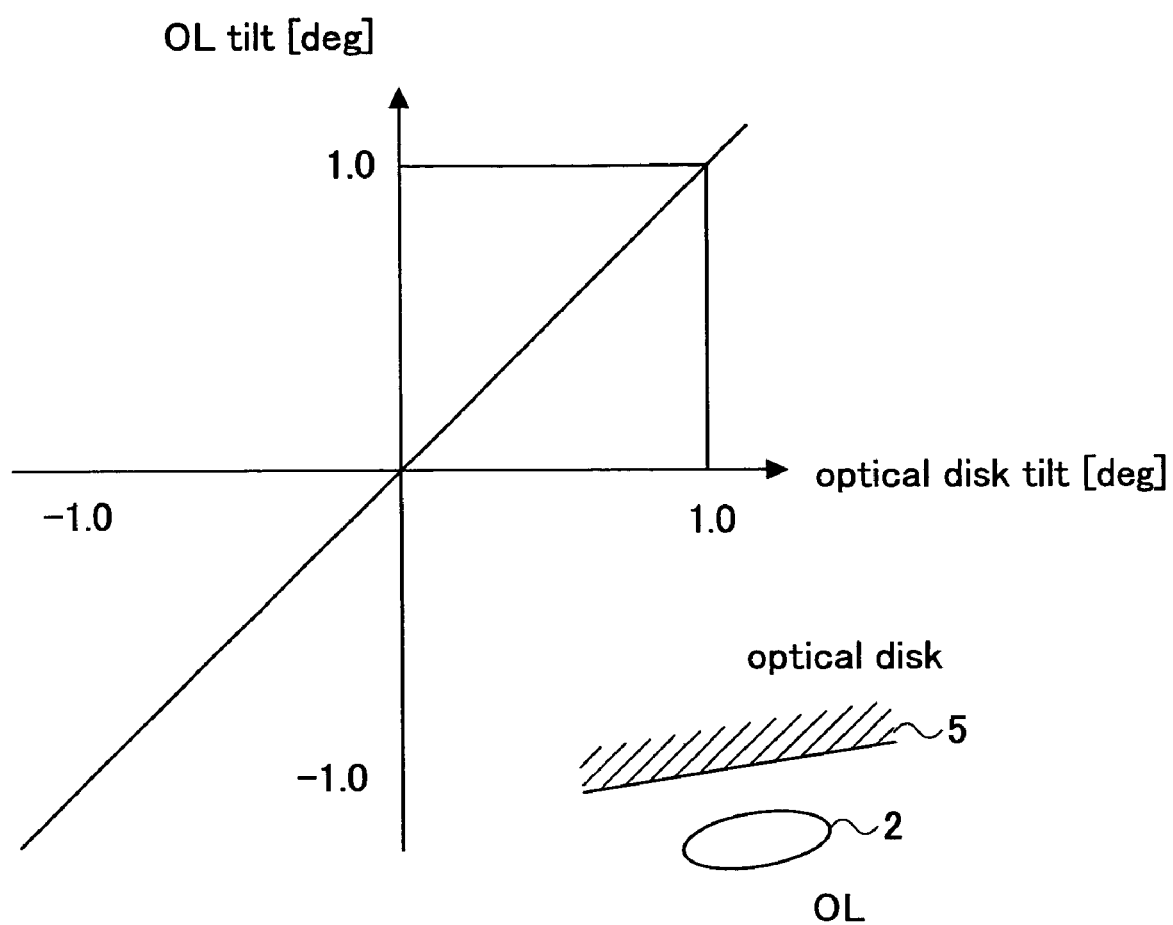
FIG. 2 shows a gain of the object lens 2 tilt angle (degrees) resulting in minimum comma aberration relative to the tilt of the optical disk 5, where the ratio of the gain is 1:1.

FIG. 2 shows a gain of the object lens 2 tilt angle (degrees) resulting in minimum comma aberration relative to the tilt of the optical disk 5, where the ratio of the gain is 1:1.

For example, as shown in FIG. 2, when the object lens 2 tilt angle (degrees) resulting in the minimum comma aberration is 1:1 relative to the tilt of the optical disk 5, the gain of the gain variable amplifier 11 arranged at the later stage of the object lens tilt sensor 10 may be set to be the same as the gain of the gain variable amplifier 14 arranged a later stage on an output side of the optical disk tilt sensor 13. Due to this, the tilt angle of the object lens 2 can be controlled to be the same angle in the same direction relative to the tilt of the optical disk 5 to make the comma aberration minimum.

Figure 3:
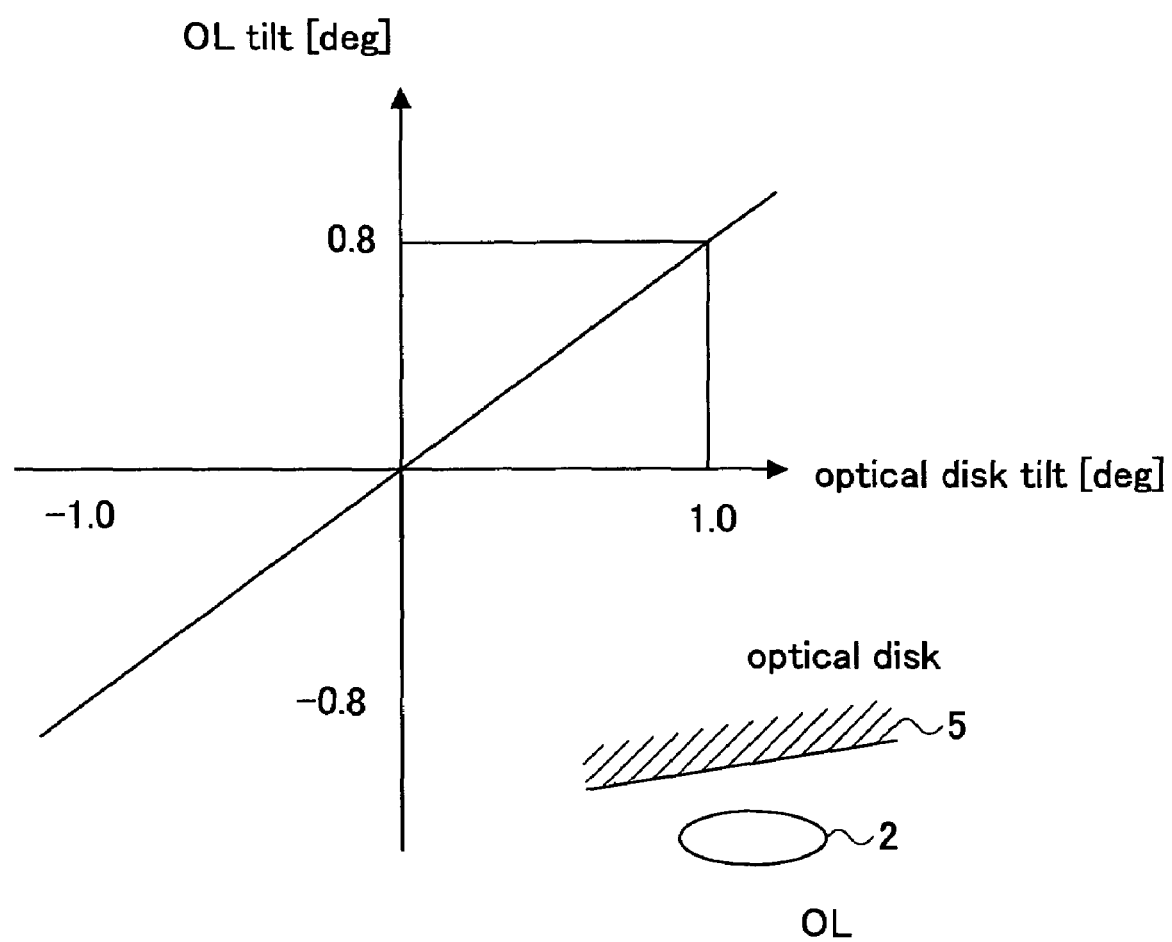
FIG. 3 shows a gain of the object lens 2 tilt angle resulting in minimum comma aberration relative to the tilt of the optical disk 5, where the ratio of the gain is 1:0.8.

FIG. 3 shows a gain of the object lens 2 tilt angle resulting in minimum comma aberration relative to the tilt of the optical disk 5, where the ratio of the gain is 1:0.8.

For example, as shown in FIG. 3, when the object lens 2 tilt angle resulting in the minimum comma aberration is 1:0.8 relative to the tilt of the optical disk 5, the gain of the gain variable amplifier 11 arranged at the later stage of the object lens tilt sensor 10 and the gain of the gain variable amplifier 14 arranged a later stage on an output side of the optical disk tilt sensor 13 is set to satisfy 1:0.8. Due to this, the tilt angle of the object lens 2 can be controlled to be 0.8 times of the tilt of the optical disk 5 to make the comma aberration minimum. In this case, except for a tilt of zero, the object lens 2 is not parallel to the tilt of the optical disk 5.

Figure 4:
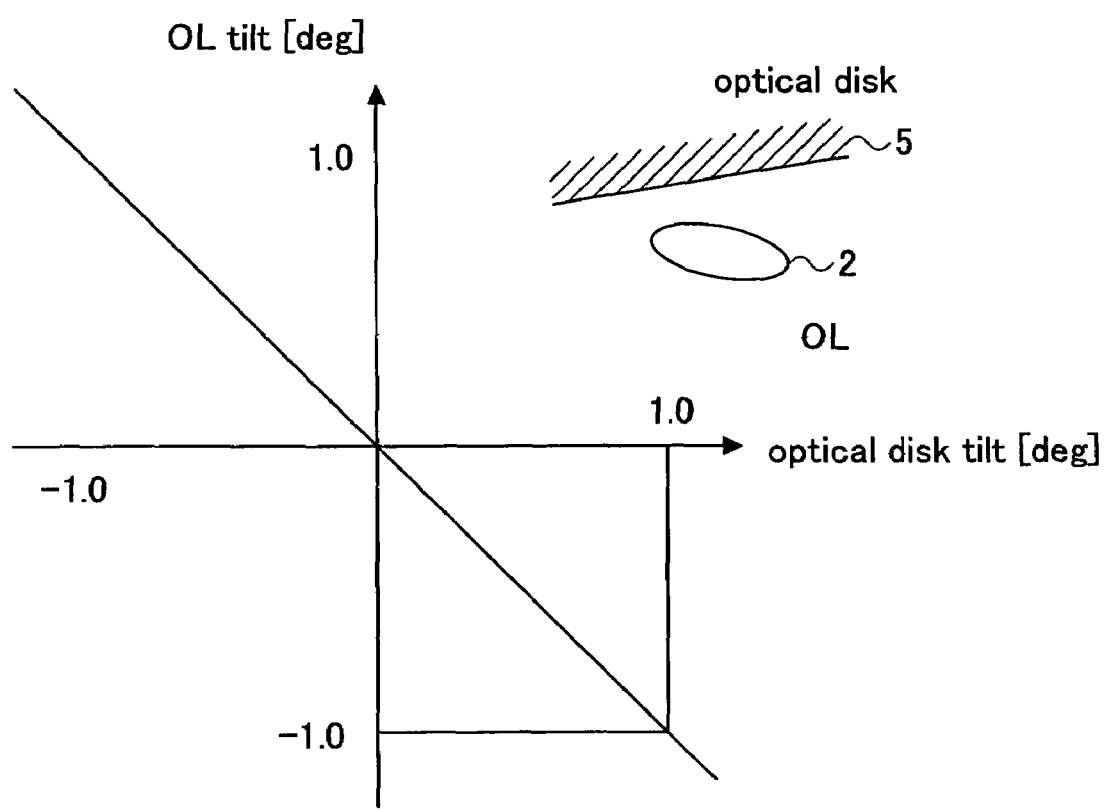
FIG. 4 shows a gain of the object lens 2 tilt angle (degrees) resulting in minimum comma aberration relative to the tilt of the optical disk 5, where the ratio of the gain is 1:−1.

FIG. 4 shows a gain of the object lens 2 tilt angle (degrees) resulting in minimum comma aberration relative to the tilt of the optical disk 5, where the ratio of the gain is 1:−1.

For example, as shown in FIG. 3, when the object lens 2 tilt angle resulting in the minimum comma aberration is 1:−1 relative to the tilt of the optical disk 5, the gain of the gain variable amplifier 11 arranged at the later stage of the object lens tilt sensor 10 and the gain of the gain variable amplifier 14 arranged a later stage on an output side of the optical disk tilt sensor 13 is set to satisfy 1:−1. Due to this, the tilt angle of the object lens 2 can be controlled to be negative to the tilt of the optical disk 5 to make the comma aberration minimum. Also in this case, except for a tilt of zero, the object lens 2 is not parallel to the tilt of the optical disk 5.

Figure 5:
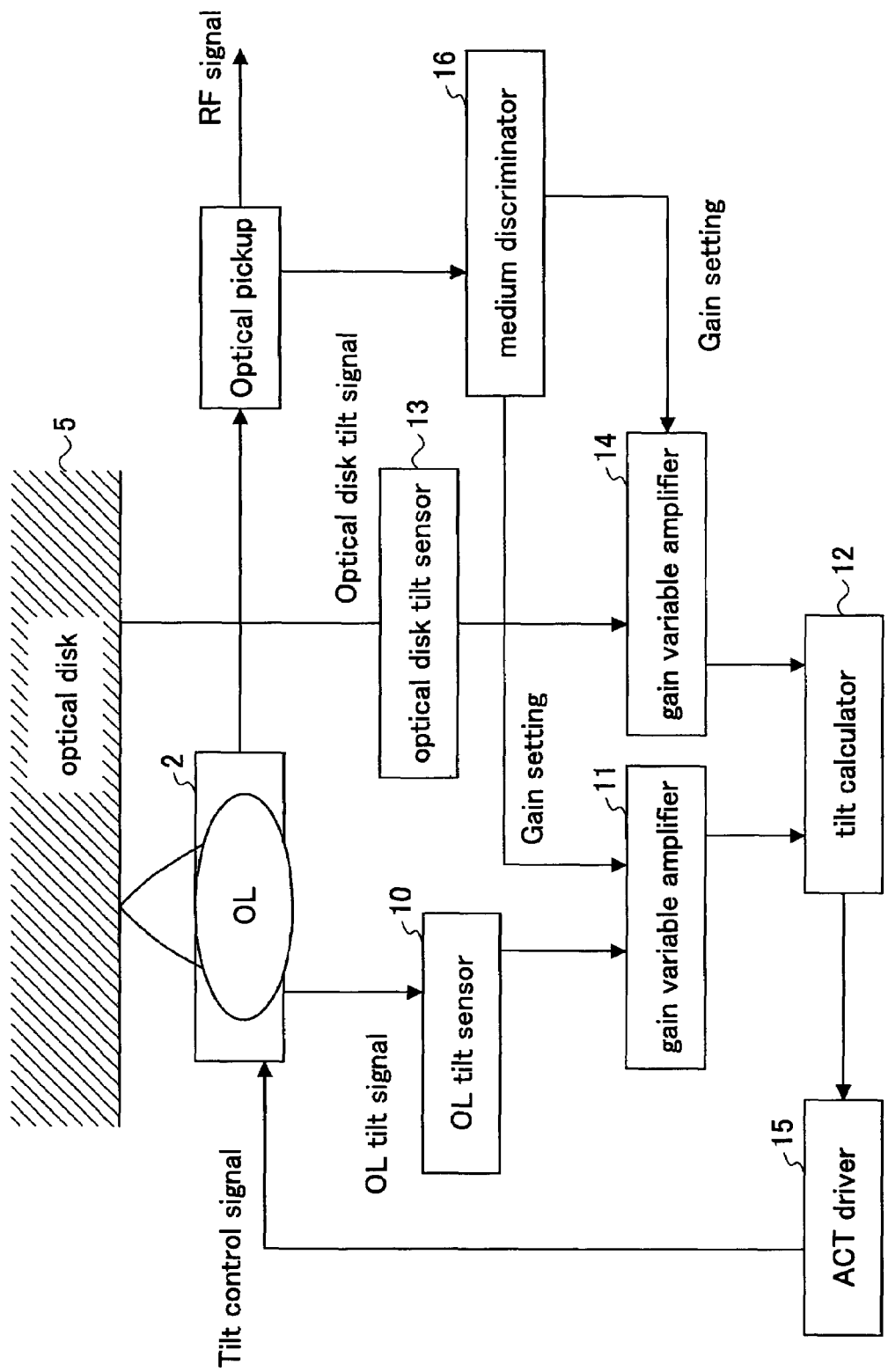
FIG. 5 is a block view schematically illustrating a first example of a configuration of an optical disk tilt compensation device according to a second embodiment of the present invention.

FIG. 5 is a block view schematically illustrating a first example of a configuration of an optical disk tilt compensation device according to a second embodiment of the present invention.

As show in FIG. 5, from a signal component detected by a not-illustrated detector is provided in an optical pickup, a medium discriminator 16 discriminates the type of the optical disk 5. Based on the discrimination results, the variable gains of the gain variable amplifier 14 and the gain variable amplifier 11 can be determined.

In the optical disk tilt compensation device of this example, the object lens (OL) 2 attached to an actuator (ACT) can support several wavelengths. For example, a light beam for a CD can be corrected as shown in FIG. 2, a light beam for a DVD can be corrected as shown in FIG. 3, and depending on the wavelength to be used, the correction is different. Because the gains of the gain variable amplifier 14 and the gain variable amplifier 11 can arbitrarily changed, it is possible to set correction suitable for each wavelength.

In addition, because it is possible to set different gains for three wavelengths, for example, as for the infrared light for CD (780 nm), the gains for the red light for DVD (650 nm), the gains for the blue light for the Blu-ray Disc (405 nm) (below, abbreviated as "BD" where necessary), the gains of the object lens amplifier and the optical disk amplifier can be calculated separately in advance.

The variable gains of the gain variable amplifier 14 and the gain variable amplifier 11 can be varied for different wavelengths based on the discrimination results of the medium discriminator 16. A light beam for a CD can be corrected as shown in FIG. 2, a light beam for a DVD can be corrected as shown in FIG. 3, and depending on the wavelength to be used, the correction is different. Because the gains of the gain variable amplifier 14 and the gain variable amplifier 11 can arbitrarily changed, it is possible to set corrections suitable for each wavelength.

In addition, the variable gains of the gain variable amplifier 14 and the gain variable amplifier 11 can be set in a stepwise manner.

For example, for a light source supporting two wavelengths for CD and DVD, two gains calculated beforehand can be stored in the gain variable amplifier 14 and the gain variable amplifier 11 to have two steps, and the gain can be switched between the two-step gain values according to types of optical disks. Further, the variable gain can be set to have three steps, and is switched to obtain light of a wavelength of one of CD, DVD, BD.

In addition, if the gain of one of the gain variable amplifier 11, which detects the tilt of the object lens 2 and is arranged at the later stage on the output side of the object lens tilt sensor 10, and the gain variable amplifier 14, which detects the tilt of the optical disk 5 and is arranged at the later stage on the output side of the optical disk tilt sensor 13, is 1, the other one of the gain variable amplifiers 11, 14 is not necessary.

For example, if the gain of the gain variable amplifier 11, which detects the tilt of the object lens 2 and is arranged at the later stage on the output side of the object lens tilt sensor 10, is 1, the gain of the gain variable amplifier 11 at the later stage on the output side of the object lens tilt sensor 10 is not necessary, and by merely adjusting the gain of the gain variable amplifier 14, which detects the tilt of the optical disk 5 and is arranged at the later stage on the output side of the optical disk tilt sensor 13, it is possible to compensate the tilt of the optical disk 5.

When both the gain variable amplifier 11 and the gain variable amplifier 14 are provided, if the gain of one of the gain variable amplifier 11, which detects the tilt of the object lens 2 and is arranged at the later stage on the output side of the object lens tilt sensor 10, and the gain variable amplifier 14, which detects the tilt of the optical disk 5 and is arranged at the later stage on the output side of the optical disk tilt sensor 13, is less than or equal to 0.9 or greater than or equal to 1.1, to make the gains of them different, when the detected tilt of the object lens 2 and the detected tilt of the optical disk 5 are different, it is possible to compensate for the tilt of the optical disk 5.

Figure 6:
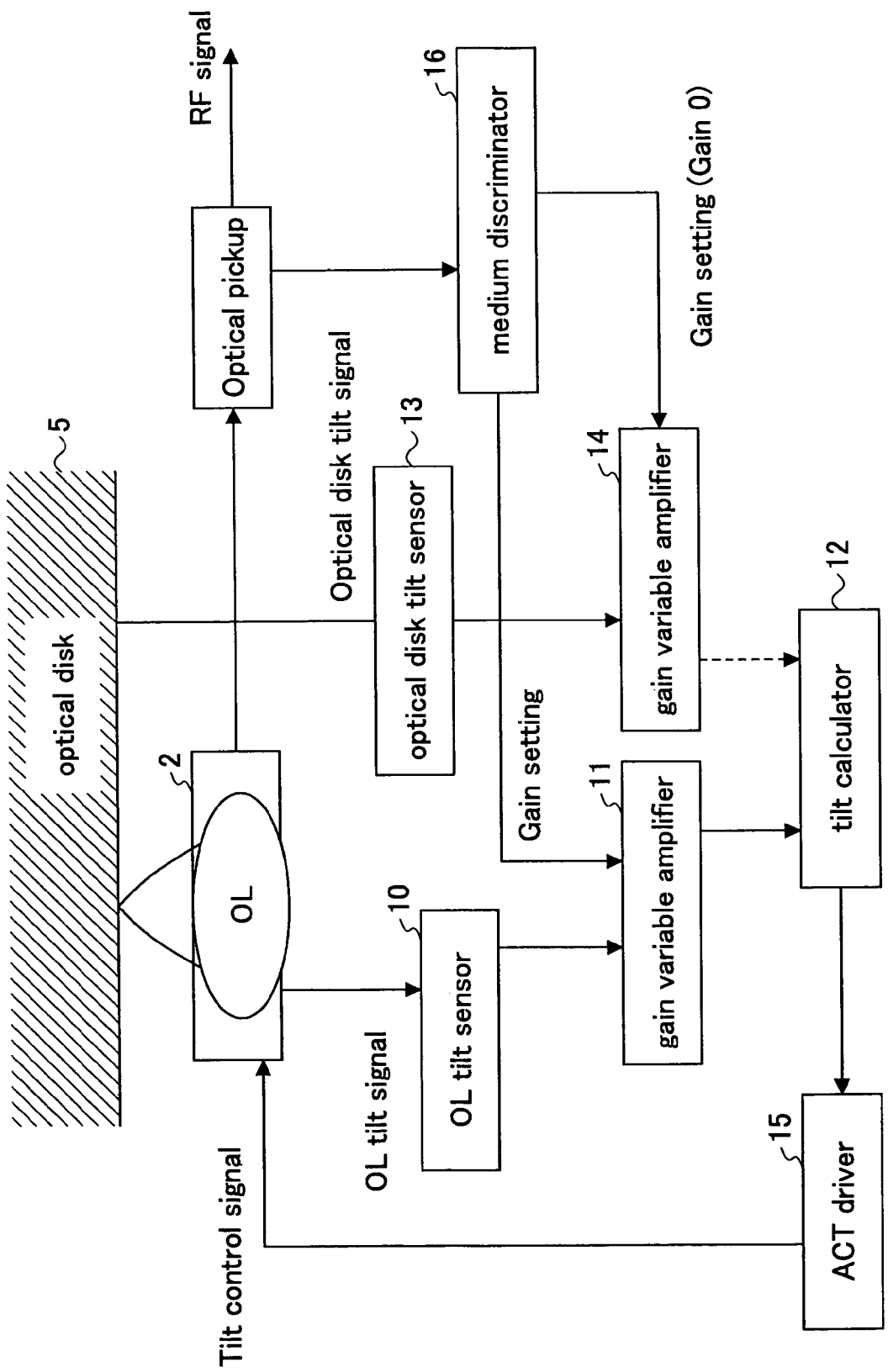
FIG. 6 is a block view schematically illustrating a second example of the configuration of an optical disk tilt compensation device according to the second embodiment of the present invention.

FIG. 6 is a block view schematically illustrating a second example of the configuration of an optical disk tilt compensation device according to the second embodiment of the present invention.

In this example, one of the settings of the stepwise variable gain is "zero" of the gain variable amplifiers in the optical disk tilt compensation device of the first example. With this setting, in either the object lens tilt sensor 10 or the optical disk tilt sensor 13, it is possible to shield an unnecessary signal during operations of the device.

Specifically, if the gain of the gain variable amplifier 14, which detects the tilt of the optical disk 5 and is arranged at the later stage on the output side of the optical disk tilt sensor 13, is zero, the output of the gain variable amplifier 14 is constantly zero regardless of the tilt of the optical disk 5, and in the tilt calculator 12, it is recorded that the tilt of the optical disk 5 is zero.

The tilt calculator 12 calculates the relative tilt between the object lens 2 and the optical disk 5 with only the tilt signal of the object lens 2 to drive the four-axial actuator (ACT). This control operation is posture control, in which the tilt of the object lens 2 is maintained to be "zero" so as to maintain the posture of the object lens 2 when the output of the optical disk tilt sensor 13 is disordered, for example, the focus conditions disappear during a track jump, or during seek operations.

It should be noted that "setting the gain of the gain variable amplifier 14 to be zero" also includes disconnecting a cord connected to the tilt calculator 12, or shielding by the mechanical switches or relays used for the cord disconnection, or electric shielding by using an FET or others.

In addition, in the present example, at least one of the gain variable amplifier 14 and the gain variable amplifier 11 is set to have a negative gain. With this setting, it is possible to set the tilt angle of the object lens 2 to be inverted compared to the tilt of the optical disk 5. Depending on setting of the object lens 2, sometimes it is possible to correct the comma aberration related to the tilt of the optical disk 5 by driving the object lens 2 with an inverted tilt setting relative to the tilt of the optical disk 5. In this case, it is necessary to set at least one of the gain variable amplifier 14 and the gain variable amplifier 11 to have a negative gain.

In addition, in the gain variable amplifier 14 and the gain variable amplifier 11, by setting the gains of them to be inverted to each other, it is possible to drive the object lens 2 with an inverted tilt relative to the tilt of the optical disk 5, and it is possible to minimize the comma aberration.

Hence, as in the above first example, by switching the settings of gains of the gain variable amplifier 14 and the gain variable amplifier 11 according to the light source wavelength, and the types of the optical disk 5, it is possible to set optimum gains at each wavelength, and perform tilt compensation of the optical disk 5 to minimize the comma aberration at each wavelength.

Further, the gains of the gain variable amplifier 14 and the gain variable amplifier 11 may have the same absolute value but different signs to obtain positive and negative gains. For example, for the BD, as shown in FIG. 2, the comma aberration becomes a minimum when the tilt angle of the object lens 2 is one times the tilt of the optical disk 5. For the CD, as shown in FIG. 4, the comma aberration becomes a minimum when the tilt angle of the object lens 2 is negative one times the tilt of the optical disk 5. In these cases, if the gain of the gain variable amplifier is fixed to be "1", and an amplifier converting the output of the gain variable amplifier, or output polarity switcher is provided, it is possible to minimize the comma aberration at each wavelength by merely switching the polarity according to the installed optical disk 5.

It should be noted that it is not necessary for the gain to be one time. As long as absolute values of the gains are the same, it is possible to compensate for the tilt of various the optical disks 5 by merely switching the polarity.

In addition, in the gain variable amplifier 14 and the gain variable amplifier 11 in the second example, each of the output signals of the amplifiers may have a portion changing constantly along with the change of the input signal.

Specifically, as shown in FIG. 2 through FIG. 4, because the input-output characteristic is linear, in order to correct the comma aberration corresponding to each optical disk 5, it is sufficient for the gain to have a constant value; thus, it is not necessary to switch the gain in response to the magnitude of the input signal.

Further, output signals of the gain variable amplifier 14 and the gain variable amplifier 11 may have a constant value in a region of the input signal.

Figure 7:
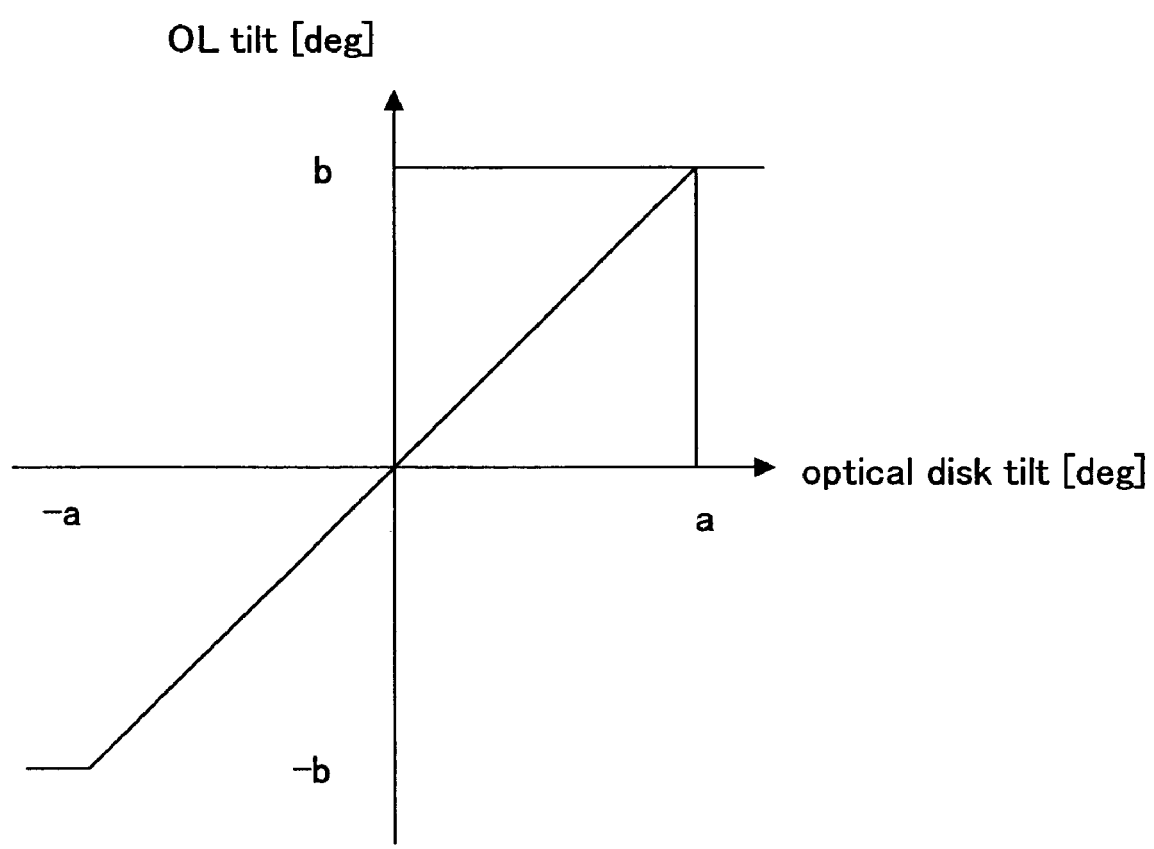
FIG. 7 shows a gain relationship in which the tilt angle of the optical disk 5 exceeds a (deg) while the object lens 2 tilt angle is a constant b (deg).

FIG. 7 shows a gain relationship in which the tilt angle of the optical disk 5 exceeds a (deg) while the object lens 2 tilt angle is a constant b (deg).

As shown in FIG. 7, while the tilt angle of the optical disk 5 is over a (deg), the object lens 2 tilt angle is a constant b (deg).

By setting the input-output characteristics to be saturated, since the tilt of the object lens 2 resulting in a minimum comma aberration is saturated relative to the tilt of the optical disk 5, even when the optical disk 5 is tilted at a large angle, it is possible to control the tilt of the object lens 2 to minimize the comma aberration.

As a third example of the optical disk tilt compensation device of the second embodiment, the variable gain of the gain variable amplifiers 11, 14 as shown in FIG. 6 may be such that the ratio of the variable gain of each of the gain variable amplifiers 11, 14 is 0.8 including the sign of the gain. Hence, because the well-known sine condition is satisfied, in a BD optical system including the object lens 2 for use of the BD, it is possible to reduce the comma aberration.

FIG. 8A through FIG. 8C illustrate the tilt of the object lens 2 required to cancel the comma aberration caused by the tilt of the BD optical disk 5, the comma aberration caused by the tilt of the object lens 2, and the tilt of the optical disk 5.

FIG. 8D through FIG. 8F illustrate the tilt of the object lens 2 required to cancel the comma aberration caused by the tilt of the DVD optical disk 5, the comma aberration caused by the tilt of the object lens 2, and the tilt of the optical disk 5.

FIG. 8G through FIG. 8I illustrate the tilt of the object lens 2 required to cancel the comma aberration caused by the tilt of the CD optical disk 5, the comma aberration caused by the tilt of the object lens 2, and the tilt of the optical disk 5.

Specifically, FIG. 8A illustrates the comma aberration occurring when the BD optical disk 5 is tilted when the tilt of the object lens 2 satisfies the sine condition.

FIG. 8B illustrates the comma aberration occurring when the object lens 2 is tilted, which has a negative sign relative to the comma aberration at the time of the tilt of the BD optical disk 5.

As shown in FIG. 8C, if the object lens 2 is driven relative to the tilt of the optical disk 5, the comma aberration caused by the tilt of the optical disk 5 can be cancelled by the tilt of the object lens 2. In this case, the tilt direction of the object lens 2 is parallel to the tilt direction of the optical disk 5.

In addition, the variable gain of the gain variable amplifiers 11, 14 as shown in FIG. 6 may be such that the ratio of the variable gain of each of the gain variable amplifiers 11, 14 is −1.0 including the sign of the gain. Hence, in a CD finite system including the object lens 2 for use of the BD, it is possible to reduce the comma aberration.

Here, the object lens 2 for use of the BD is a single object lens 2 for the blue wavelength and results in a minimum wave aberration at 0.6 mm in a disk substrate; the CD finite system indicates the incident light beam to the object lens 2 is in a divergent state or in a focused state.

Generally, when the infrared light for use of CD is incident into the object lens 2 for use of the BD, and a beam spot is formed on the CD, the spherical aberration occurs because of differences of the wavelengths in use and substrate thicknesses.

Because a change of the divergent state of the light incident into the object lens 2 is equivalent to a change of the spherical aberration, the spherical aberration can be reduced by selecting an appropriate divergent state.

In the above optical system, when controlling the comma aberration caused by the tilt of the optical disk 5 through the comma aberration due to the tilt of the object lens 2, as described above, the ratio of the variable gain may be −1.0.

Specifically, FIG. 8G illustrates the comma aberration occurring when the optical disk 5 is tilted when the light is condensed in the CD finite system.

FIG. 8H illustrates the comma aberration occurring when the object lens 2 is tilted, which has the same sign as the optical disk 5.

As shown in FIG. 8I, if the object lens 2 is driven relative to the tilt of the optical disk 5, the comma aberration caused by the tilt of the optical disk 5 can be cancelled by the tilt of the object lens 2. In this case, the tilt direction of the object lens 2 changes in a direction opposite to the tilt direction of the optical disk 5.

In addition, the variable gain of the gain variable amplifiers 11, 14 as shown in FIG. 6 may be such that the ratio of the variable gain of each of the gain variable amplifiers 11, 14 is 1.0 or 0.8 including the sign of the gain. Because these two values can be switched easily, for example, in a two-wavelength compatible optical system including a BD infinite system having a first phase correction element and a DVD finite system at the front stage of the object lens 2 for use of the BD, it is possible to reduce the comma aberration at either of the wavelengths.

Specifically, the object lens 2 for use of the BD is a single object lens 2 for the blue wavelength light and results in a minimum wave aberration at 0.6 mm in a disk substrate; the first phase correction element does not react at the blue wavelength for BD use, but produces certain spherical aberration when the red light for use of DVD passes through. Generally, Generally, when the red light for use of DVD is incident on the object lens 2 for use of the BD, and a beam spot is formed, the spherical aberration occurs because of the difference of the wavelengths in use.

In order to produce a spherical aberration having a negative sign relative to the unnecessary spherical aberration, the two-wavelength compatible optical system including the first phase correction element can be used.

Figure 9A:
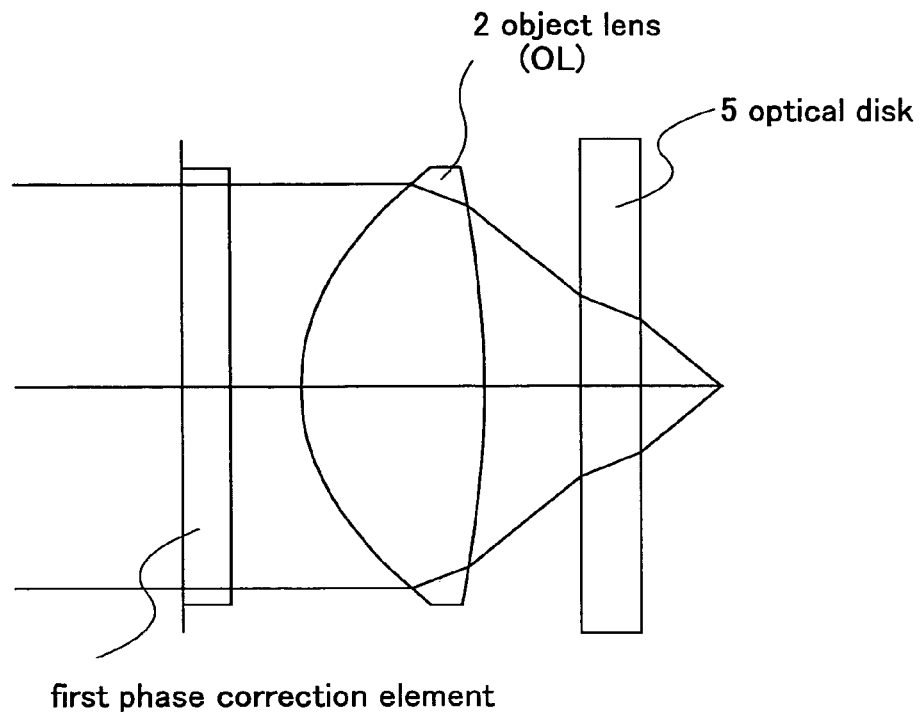
FIG. 9A is a schematic view illustrating a configuration of the two-wavelength compatible optical system including a phase correction element able to produce a spherical aberration having a negative sign relative to the unnecessary spherical aberration.

FIG. 9A is a schematic view illustrating a configuration of the two-wavelength compatible optical system including a phase correction element able to produce a spherical aberration having a negative sign relative to the unnecessary spherical aberration.

In above the two-wavelength compatible optical system, when controlling the comma aberration caused by the tilt of the optical disk 5 through the comma aberration due to the tilt of the object lens 2, the ratio of the variable gain may be 1.0 in a BD system, and may be 0.8 in a DVD system. That is, FIG. 8A through 8C illustrates the situation when using the object lens 2 for use of Bb in the blue wavelength region, which satisfy the sine condition. FIG. 8D illustrate the comma aberration caused by the tilt of the DVD optical disk when the light is condensed in the DVD red wavelength system.

FIG. 8E illustrate the comma aberration occurring at the time of the tilt of the object lens 2 and having a negative sign relative to the comma aberration caused by the tilt of the optical disk 5.

Therefore, as shown in FIG. 8F, if the object lens 2 is driven relative to the tilt of the optical disk 5, the comma aberration caused by the tilt of the optical disk 5 can be cancelled by the tilt of the object lens 2. In this case, the tilt direction of the object lens 2 is parallel to the tilt direction of the optical disk 5.

In addition, the variable gain of the gain variable amplifiers 11, 14 as shown in FIG. 6 may be such that the ratio of the variable gain of each of the gain variable amplifiers 11, 14 is 1.0, or 0.8, or −1.0 including the sign of the gain. Because these three values can be switched easily, for example, in a three-wavelength compatible optical system including a BD infinite system having a first phase correction element, a DVD finite system, and a CD finite system at the front stage of the object lens 2 for use of the BD, it is possible to reduce the comma aberration at each of the three wavelengths.

In the above three-wavelength compatible optical system, the object lens 2 for use of the BD is a single object lens 2 for the blue wavelength light and results in a minimum wave aberration at 0.6 mm in a disk substrate; the first phase correction element does not react at the blue wavelength for BD use and the infrared wavelength for CD use, but produces a certain spherical aberration when the red light for use of DVD passes through. As described above, generally, when the red light is incident on the object lens 2 for use of the BD, and a beam spot is formed, the spherical aberration occurs because of the difference of the wavelengths in use.

In order to produce a spherical aberration having a negative sign relative to the unnecessary spherical aberration, the three-wavelength compatible optical system including the first phase correction element can be used.

Although the spherical aberration occurs in the similar way when a spot is focused in a CD system, because the light beam is incident on the object lens 2 in a CD finite system, it is possible to reduce the spherical aberration. In the CD finite system, because the light beam incident on the object lens 2 is in a divergent state or in a focused state, a change of the divergent state of the light incident on the object lens 2 is equivalent to a change of the spherical aberration. Thus, the spherical aberration can be reduced by selecting an appropriate divergent state.

In the above three-wavelength compatible optical system, when controlling the comma aberration caused by the tilt of the optical disk 5 through the comma aberration due to the tilt of the object lens 2, the ratio of the variable gain may be 1.0 in a BD system, may be 0.8 in a DVD system, and may be −1.0 in a CD system.

That is, as descriptions of the BD system, or the two-wavelength compatible optical system including the BD system and the CD system or DVD system, FIG. 8A through FIG. 8C illustrate the situations of the BD system, FIG. 8D through FIG. 8F illustrate the situations of the DVD system, and FIG. 8G through FIG. 8I illustrate the situations of the CD system.

In addition, the variable gain of the gain variable amplifiers 11, 14 as shown in FIG. 6 may be such that the ratio of the variable gain of each of the gain variable amplifiers 11, 14 is 1.0, or 2.0, or −1.0 including the sign of the gain. Because these three values can be switched easily, for example, in a three-wavelength compatible optical system including a BD infinite system having a second phase correction element, a DVD finite system, and a CD finite system at the front stage of the object lens 2 for use of the BD, it is possible to reduce the comma aberration at each of the three wavelengths.

Figure 9B:
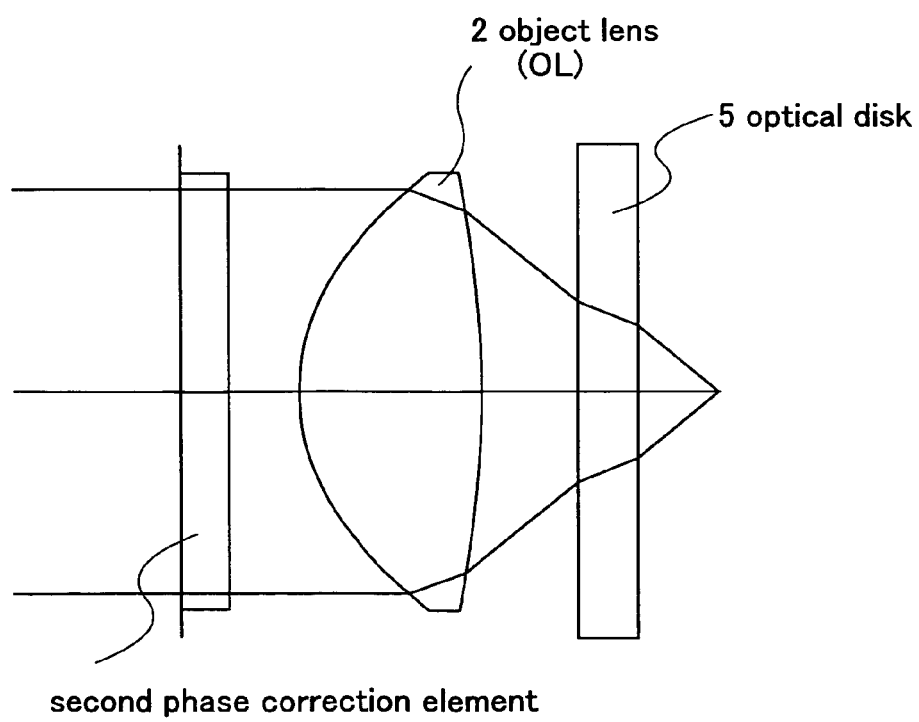
FIG. 9B is a schematic view illustrating a configuration of a three-wavelength compatible optical system.

FIG. 9B is a schematic view illustrating a configuration of a three-wavelength compatible optical system.

Specifically, the object lens 2 for use of the BD is a single object lens 2 for the blue wavelength light and results in a minimum wave aberration at 0.6 mm in a disk substrate 5; the second phase correction element does not react at the blue wavelength for BD use and the infrared wavelength for CD use, but produces a certain spherical aberration when the red light for use of DVD passes through.

When the red light for DVD use is incident on the object lens 2 for use of the BD, and a beam spot is formed, the spherical aberration occurs because of the difference of the wavelengths in use.

Because of usage of the DVD finite system, the light beam incident on the object lens 2 is in a divergent state or in a focused state. Further, a change of the divergent state of the light incident into the object lens 2 is equivalent to a change of the spherical aberration. Thus, the spherical aberration can be reduced by selecting an appropriate divergent state.

However, the spherical aberration in a DVD system cannot be eliminated sufficiently in the above way. In order to produce a spherical aberration having a negative sign relative to the residual spherical aberration, the second phase correction element is provided.

In addition, although the spherical aberration occurs in a similar way when a spot is focused in a CD system, by processing the light incident on the object lens in a finite system, the three-wavelength compatible optical system is able to reduce the spherical aberration.

In the above three-wavelength compatible optical system, when controlling the comma aberration caused by the tilt of the optical disk 5 through the comma aberration due to the tilt of the object lens 2, the ratio of the variable gain may be 1.0 in a BD system, may be 2.0 in a DVD system, and may be −1.0 in a CD system.

FIG. 10A through FIG. 10C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 10D through FIG. 10F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 10G through FIG. 10I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

In addition, the variable gain of the gain variable amplifiers 11, 14 as shown in FIG. 6 may be such that the ratio of the variable gain of each of the gain variable amplifiers 11, 14 is 1.0, or −4.0, or −1.1 including the sign of the gain. Because these three values can be switched easily, for example, in a three-wavelength compatible optical system including a BD infinite system having an object lens 2 for BD use satisfying the sine condition under certain glass types, a DVD finite system, and a CD finite system, it is possible to reduce the comma aberration at each of the three wavelengths.

Figure 11A:
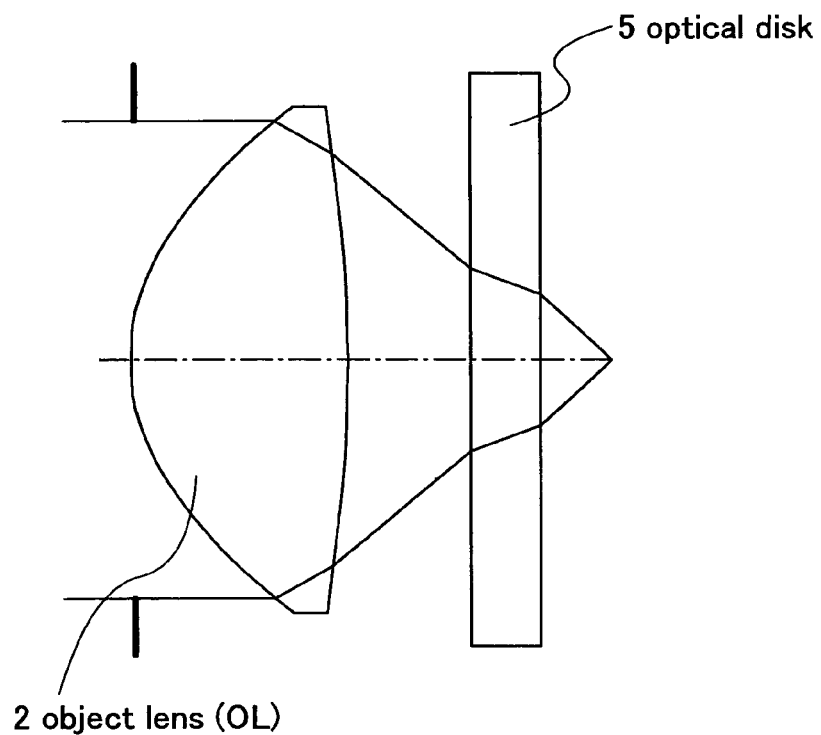
FIG. 11A is a schematic view illustrating a configuration of a three-wavelength compatible optical system.

FIG. 11A is a schematic view illustrating a configuration of a three-wavelength compatible optical system.

Specifically, the certain glass types may include the following conditions: the refractive index nd relative to a d-line material and the Abbe number vd satisfies vd>35, and 1.58>nd. If these conditions are satisfied, it is possible to reduce the spherical aberration occurring when recording or reproducing data in the DVD optical disk 5. Thus, it is possible to obtain a configuration without the above-mentioned phase correction elements, and it is possible to obtain a three-wavelength compatible optical system having fewer parts, low cost, and a smaller number of assembly steps.

In the above three-wavelength compatible optical system, when controlling the comma aberration caused by the tilt of the optical disk 5 through the comma aberration due to the tilt of the object lens 2, the ratio of the variable gain may be 1.0 in a BD system, may be −4.0 in a DVD system, and may be −1.1 in a CD system.

FIG. 12A through FIG. 12C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 12D through FIG. 12F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 12G through FIG. 12I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

In addition, the variable gain of the gain variable amplifiers 11, 14 as shown in FIG. 6 may be such that the ratio of the variable gain of each of the gain variable amplifiers 11, 14 is 0.8, or 1.0, or −4.0 including the sign of the gain. Because these three values can be switched easily, for example, in a three-wavelength compatible optical system including a BD infinite system having an object lens 2 formed from two bonded lenses, a DVD finite system, and a CD finite system, it is possible to reduce the comma aberration at each of the three wavelengths.

Figure 11B:
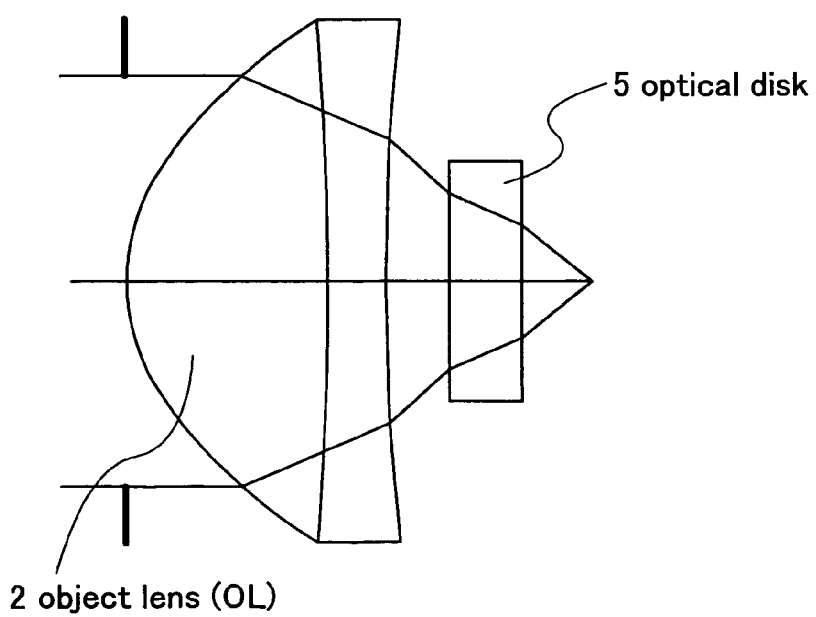
FIG. 11B is a schematic view illustrating a configuration of a three-wavelength compatible optical system.

FIG. 11B is a schematic view illustrating a configuration of a three-wavelength compatible optical system.

Specifically, the object lens 2 formed from two bonded lenses is used to reduce the spherical aberration occurring when recording or reproducing data in the DVD optical disk by modifying the object lens 2 instead of using the above mentioned phase correction elements. Generally, if a lens having a positive refractive power and a lens having a negative refractive power are bonded together, it is known that it is possible to reduce the color aberration. Namely, here, the lens is able to correct the color aberration from the blue light wavelength region to the red light wavelength region.

Although the spherical aberration occurs in a similar way when a spot is focused in a CD system, by processing the light incident on the object lens in a finite system, the three-wavelength compatible optical system is able to reduce the spherical aberration.

In the above three-wavelength compatible optical system, when controlling the comma aberration caused by the tilt of the optical disk 5 through the comma aberration due to the tilt of the object lens 2, the ratio of the variable gain may be 0.8 in a BD system, may be 1.0 in a DVD system, and may be −4.0 in a CD system.

FIG. 13A through FIG. 13C illustrate the tilt of the object lens 2 required to cancel the comma aberration caused by the tilt of the optical disk 5, the comma aberration caused by the tilt of the object lens 2, and the tilt of the optical disk 5 at the blue light wavelength region.

FIG. 13D through FIG. 13F illustrate the tilt of the object lens 2 required to cancel the comma aberration caused by the tilt of the optical disk 5, the comma aberration caused by the tilt of the object lens 2, and the tilt of the optical disk 5 at the red light wavelength region.

FIG. 13G through FIG. 13I illustrate the tilt of the object lens 2 required to cancel the comma aberration caused by the tilt of the optical disk 5, the comma aberration caused by the tilt of the object lens 2, and the tilt of the optical disk 5 at the infrared light wavelength region.

In the optical disk tilt compensation devices according to the first embodiment and the first embodiments of the present invention, the tilt of the object lens 2 and the tilt of the optical disk 5 in the radial direction and the tangential direction of the optical disk 5 are measured separately but at the same time for tilt compensation. Since the tilts in the two directions are measured separately for tilt control, it is possible to realize the tilt control of the object lens 2 following the inclination including the tilt direction of the optical disk 5.

Figure 14:
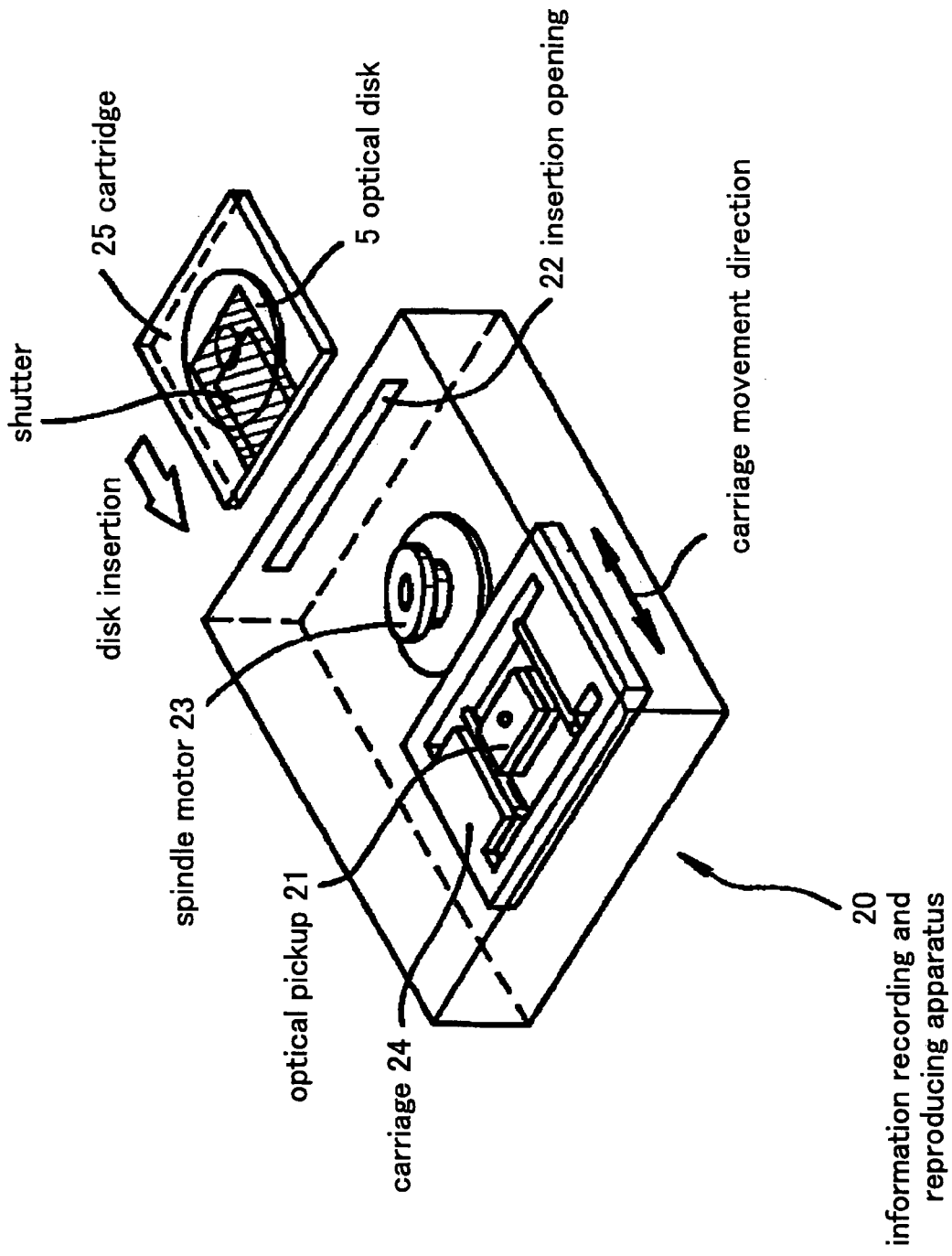
FIG. 14 is a perspective view illustrating a schematic configuration of an optical information processing apparatus for recording and reproducing data.
Figure 15:
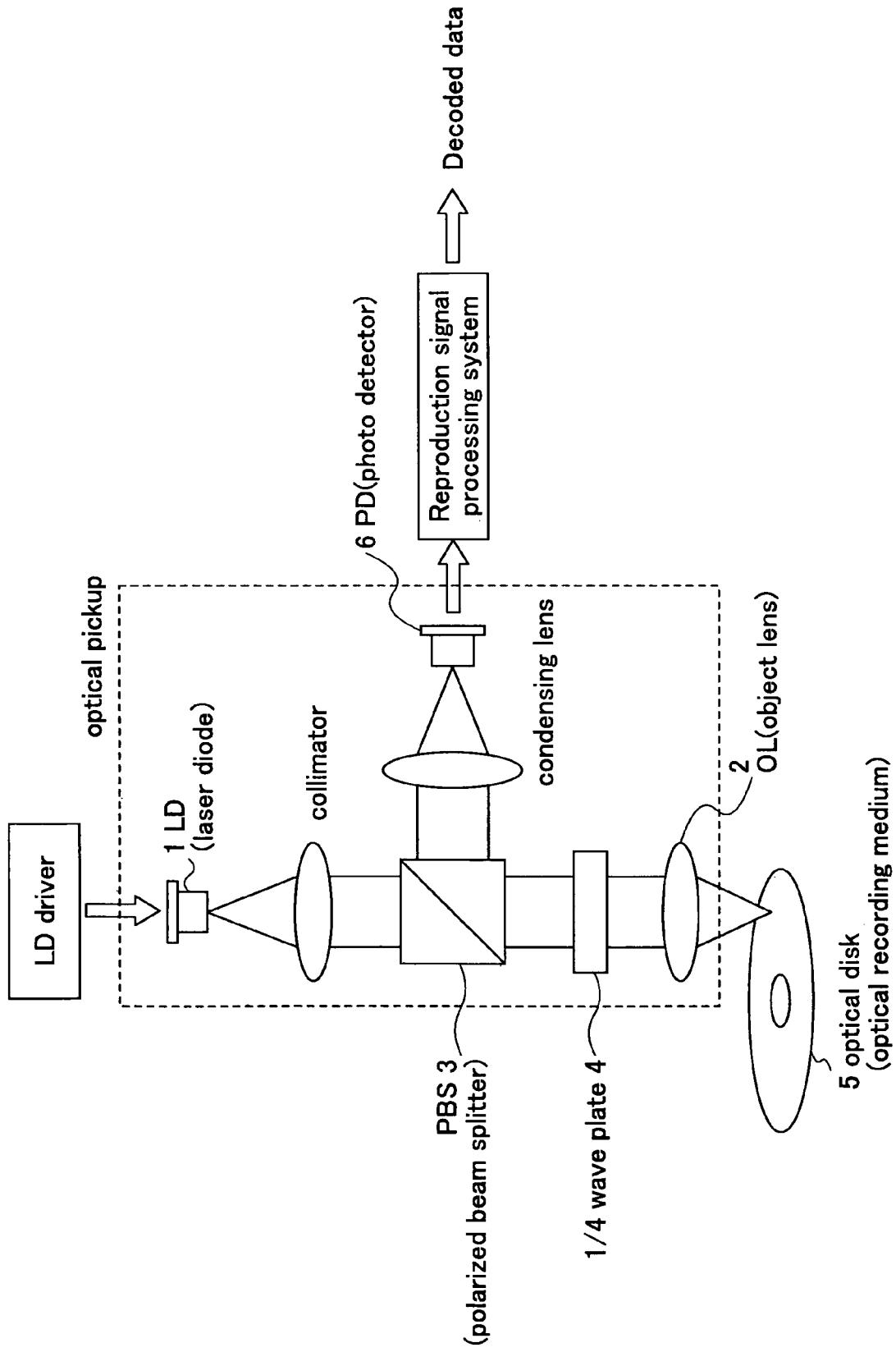
FIG. 15 is a schematic view of an optical pickup capable of writing data in a DVD in the related art.
Figure 17:
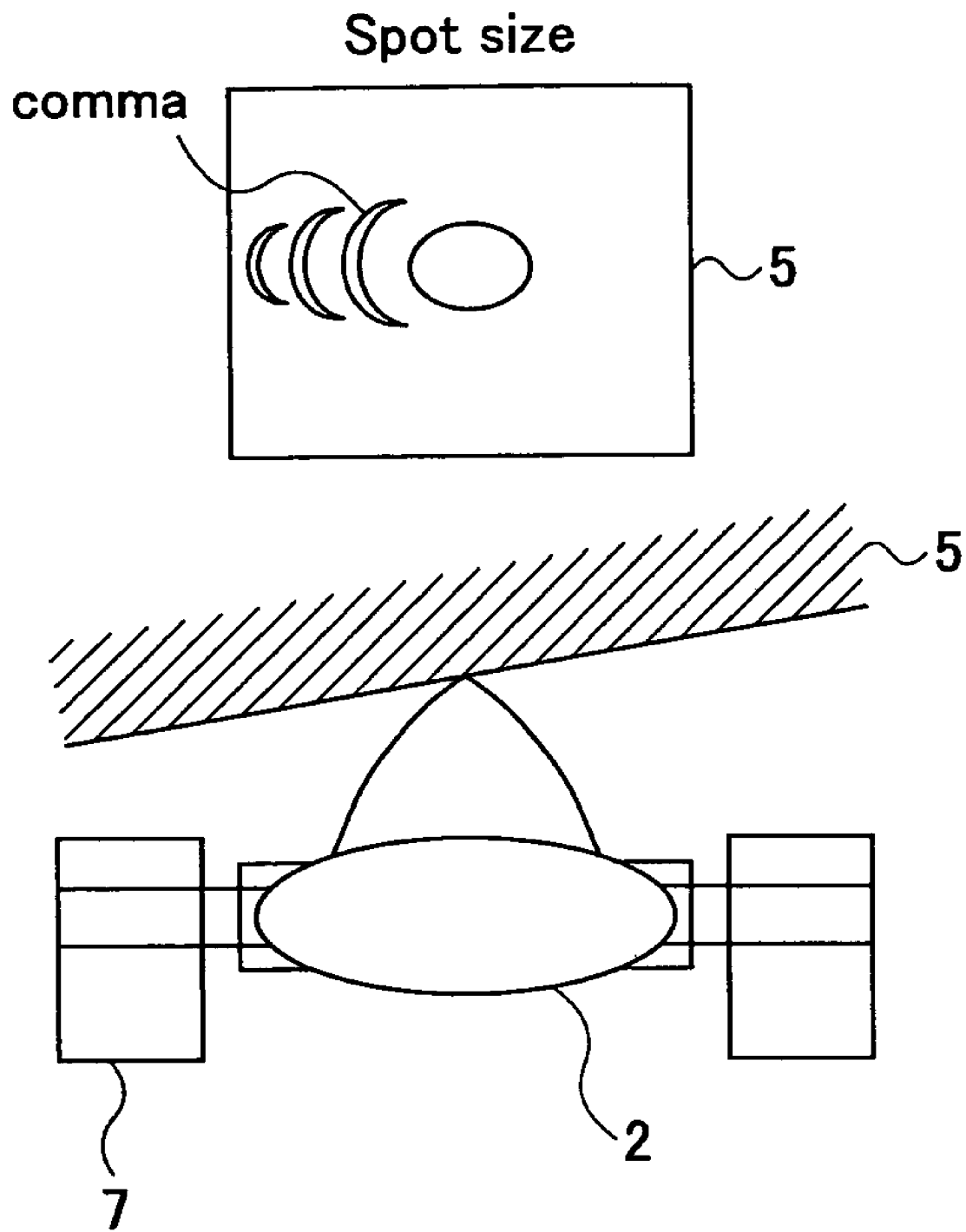
FIG. 17 is a schematic view illustrating an arrangement of the object lens 2 and the four-axial actuator 7 and the size of the light spot on an optical disk under abnormal tilt driving condition in the related art.
Figure 18:
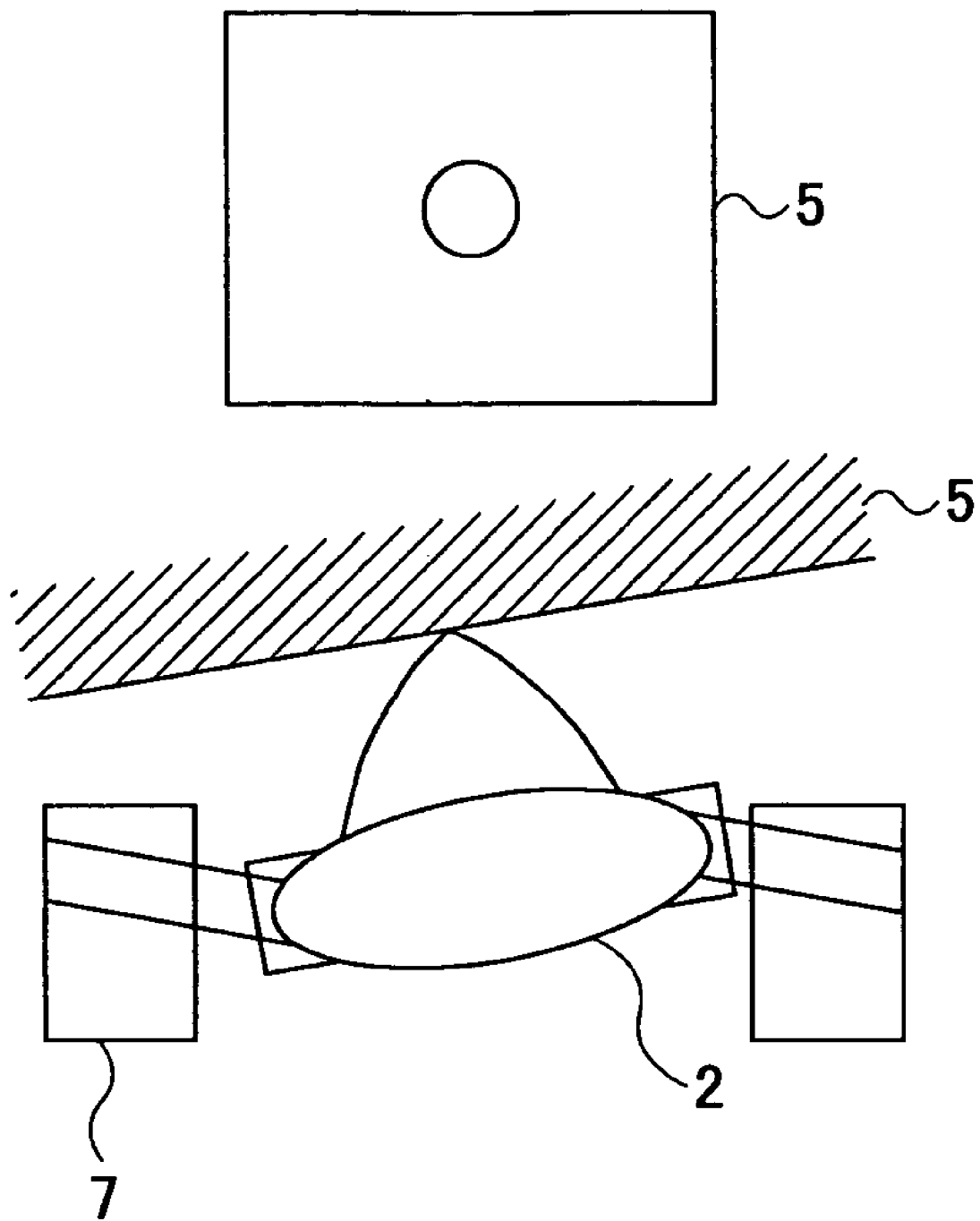
FIG. 18 is a schematic view illustrating an arrangement of the object lens 2 and the four-axial actuator 7 and the size of the light spot on an optical disk in the course of tilt compensation in the related art.

FIG. 14 is a perspective view illustrating a schematic configuration of an optical information processing apparatus for recording and reproducing data.

As shown in FIG. 14, an information recording and reproducing apparatus 20 uses an optical pickup 21 to record, reproduce, or delete data in the optical disk 5.

In a third embodiment of the present invention, the optical disk 5 is held in a cartridge 25 serving as a protection case. The optical disk 5 is inserted into the information recording and reproducing apparatus 20 from an insertion opening 22 along a "disk insertion" arrow, is driven to rotate by a spindle motor 23, and data therein is recorded, reproduced, or deleted. It should be noted that it is not necessary that the optical disk 5 be held in the cartridge 25, but can be held without the cartridge 25.

The information recording and reproducing apparatus 20 according to the third embodiment of the present invention includes the optical disk tilt compensation devices as described above to record and reproduce data in the optical disk 5. Because of the optical disk tilt compensation devices as described above are used, it is possible to reduce the margin of the tilt of the optical disk 5. For example, the unused margin can be used in high precision design of optical lenses supporting three wavelengths. For this reason, it is possible to provide an optical pickup and an optical information recording apparatus capable of information recording and reproduction at high speed.

The optical recording medium tilt compensation device, the tilt compensation method, and the optical information recording apparatus using the optical recording medium tilt compensation device are able to perform focusing and irradiation at high precision with little comma aberration of a beam spot of a light beam from a light source, and are able to perform recording and reproduction at high speed. It is useful for servo control to be used when recording or reproducing data in an optical recording medium, particularly as a tilt compensation unit for correcting the tilt error.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

What is claimed is:

1. An optical recording medium tilt compensation device comprising:
    an object lens that condenses light from a light source on a recording surface of an optical recording medium;
    an object lens tilt actuator that controls a tilt of the object lens;
    an object lens tilt sensor that detects the tilt of the object lens;
    an optical recording medium tilt sensor that detects a tilt of the optical recording medium;
    a control unit that controls the tilt of the object lens in accordance with a tilt value from the optical recording medium tilt sensor so that an aberration of the spot condensed on the recording surface is made minimum by driving the object lens tilt actuator; and
    a gain variable unit that changes a magnitude of an output signal from the object lens tilt sensor or the optical recording medium tilt sensor,
    wherein the gain variable unit changes the variable gain stepwise, and
    wherein one of the settings of the stepwise variable gain is zero.

2. An optical recording medium tilt compensation device comprising:
    an object lens that condenses light from a light source on a recording surface of an optical recording medium;
    an object lens tilt actuator that controls a tilt of the object lens;
    an object lens tilt sensor that detects the tilt of the object lens;
    an optical recording medium tilt sensor that detects a tilt of the optical recording medium;
    a control unit that controls the tilt of the object lens in accordance with a tilt value from the optical recording medium tilt sensor so that an aberration of the spot condensed on the recording surface is made minimum by driving the object lens tilt actuator; and
    a gain variable unit that changes a magnitude of an output signal from the object lens tilt sensor or the optical recording medium tilt sensor,
    wherein the gain variable unit changes the variable gain stepwise, and
    wherein the stepwise variable gain includes three settings.

3. The optical recording medium tilt compensation device as claimed in claim 2, wherein the stepwise variable gain includes three settings, and one of the three settings is zero.

4. An optical recording medium tilt compensation device comprising:
    an object lens that condenses light from a light source on a recording surface of an optical recording medium;
    an object lens tilt actuator that controls a tilt of the object lens;
    an object lens tilt sensor that detects the tilt of the object lens;
    a first gain variable unit that amplifies amplitude of an output signal from the object lens tilt sensor;
    an optical recording medium tilt sensor that detects a tilt of the optical recording medium;
    a second gain variable unit that amplifies amplitude of an output signal from the optical recording medium tilt sensor; and
    a control unit that controls the tilt of the object lens in accordance with a tilt value from the optical recording medium tilt sensor so that an aberration of the spot condensed on the recording surface is made minimum by driving the object lens tilt actuator; wherein
    a variable gain of the tilt of the object lens of the first gain variable unit including the object lens tilt sensor is different from a variable gain of the tilt of the optical recording medium of the second gain variable unit including the optical recording medium tilt sensor,
    wherein the setting of the stepwise variable gain of one of the gain variable units respectively arranged at a later stage on an output side of the object lens tilt sensor and arranged at a later stage on an output side of the optical recording medium tilt sensor is less than or equal to 0.9 or greater than or equal to 1.1.

5. The optical recording medium tilt compensation device as claimed in claim 1, wherein the gain variable unit sets the variable gain to be a negative setting.

6. The optical recording medium tilt compensation device as claimed in claim 1, wherein the setting of the stepwise variable gain of the gain variable unit arranged at a later stage on an output side of the object lens tilt sensor has a sign opposite to the setting of the stepwise variable gain of the gain variable unit arranged at a later stage on an output side of the optical recording medium tilt sensor.

7. The optical recording medium tilt compensation device as claimed in claim 1, wherein the setting of the stepwise variable gain of the gain variable unit arranged at a later stage on an output side of the object lens tilt sensor and setting of the stepwise variable gain of the gain variable unit arranged at a later stage on an output side of the optical recording medium tilt sensor have opposite signs but the same absolute value by switching the polarity of one of the gain variable units.

8. The optical recording medium tilt compensation device as claimed in claim 1, wherein the gain variable unit arranged at a later stage on an output side of the object lens tilt sensor and the gain variable unit arranged at a later stage on an output side of the optical recording medium tilt sensor change a setting of the variable gain according to a determination result of a determination unit for determining a wavelength of the light source in use and the type of the optical recording medium.

9. The optical recording medium tilt compensation device as claimed in claim 1, wherein an output signal from the gain variable unit includes a portion changing constantly while the input signal is changing.

10. An optical recording medium tilt compensation device as claimed in claim 9, wherein the output signal from the gain variable unit includes a portion having a constant output value with respect to a region of the input signal.

11. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is 0.8 including the signs thereof.

12. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is −1.0 including the signs thereof.

13. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is switched between 0.8 and 1.0 including the signs thereof.

14. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is switched between 1.0, 0.8, and −1.0 including the signs thereof.

15. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is switched between 1.0, 2.0, and −1.0 including the signs thereof.

16. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is switched between 1.0, −4.0, and −1.1 including the signs thereof.

17. The optical recording medium tilt compensation device as claimed in claim 1, wherein a ratio of the variable gain of each of the gain variable units respectively arranged at a later stage on an output side of the object lens tilt sensor and arranged at a later stage on an output side of the optical recording medium tilt sensor is switched between 0.8, 1.0, and −4.0 including the signs thereof.

* * * * *

UNITED STATES PATENT AND TRADEMARK OFFICE
CERTIFICATE OF CORRECTION

PATENT NO. : 7,577,070 B2
APPLICATION NO. : 11/373992
DATED : August 18, 2009
INVENTOR(S) : Kawasaki et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 753 days.

Signed and Sealed this

Seventh Day of September, 2010

David J. Kappos
*Director of the United States Patent and Trademark Office*